United States Patent
Huddleston et al.

(10) Patent No.: US 10,558,666 B2
(45) Date of Patent: Feb. 11, 2020

(54) SYSTEMS AND METHODS FOR THE CREATION, UPDATE AND USE OF MODELS IN FINDING AND ANALYZING CONTENT

(71) Applicant: Trendkite Inc., Austin, TX (US)

(72) Inventors: Erik Lee Huddleston, Liberty Hill, TX (US); David Francis Perdue, Austin, TX (US); Matthew John Allison, Austin, TX (US); John Joseph De Oliveira, Austin, TX (US)

(73) Assignee: Trendkite, Inc., Austin, TX (US)

( * ) Notice: Subject to any disclaimer, the term of this patent is extended or adjusted under 35 U.S.C. 154(b) by 739 days.

(21) Appl. No.: 15/205,758

(22) Filed: Jul. 8, 2016

(65) Prior Publication Data

US 2017/0011092 A1    Jan. 12, 2017

Related U.S. Application Data

(60) Provisional application No. 62/191,169, filed on Jul. 10, 2015.

(51) Int. Cl.
| | |
|---|---|
| *G06F 16/00* | (2019.01) |
| *G06F 16/2455* | (2019.01) |
| *G06N 5/02* | (2006.01) |
| *G06N 20/00* | (2019.01) |
| *G06F 16/33* | (2019.01) |
| *G06F 16/338* | (2019.01) |

(52) U.S. Cl.
CPC ........ *G06F 16/2455* (2019.01); *G06F 16/338* (2019.01); *G06F 16/3331* (2019.01); *G06N 5/025* (2013.01); *G06N 20/00* (2019.01)

(58) Field of Classification Search
CPC ......... G06F 17/30477; G06F 17/30386; G06F 16/3331; G06F 16/338
USPC ................................................. 707/730, 769
See application file for complete search history.

(56) References Cited

U.S. PATENT DOCUMENTS

| | | | |
|---|---|---|---|
| 8,370,115 B2 | 2/2013 | Rossignac | |
| 9,195,749 B2 | 11/2015 | Gras | |
| 9,251,530 B1 | 2/2016 | Dachis et al. | |
| 9,298,833 B1 | 3/2016 | Kaufmann | |
| 10,162,900 B1* | 12/2018 | Chatterjee | G06F 16/9535 |
| 2002/0194161 A1* | 12/2002 | McNamee | G06F 16/951 |
| 2003/0018604 A1* | 1/2003 | Franz | G06F 16/30 |
| 2006/0248078 A1* | 11/2006 | Gross | G06F 16/3322 |
| 2015/0135057 A1* | 5/2015 | Metcalf | G06F 17/2247 |
| | | | 715/234 |
| 2015/0161242 A1* | 6/2015 | Visotski | G06F 16/338 |
| | | | 707/730 |
| 2016/0357857 A1* | 12/2016 | Langmead | G06F 16/93 |
| 2016/0357872 A1* | 12/2016 | Fader | G06Q 10/00 |

\* cited by examiner

*Primary Examiner* — Thu Nguyet T Le
(74) *Attorney, Agent, or Firm* — DLA Piper LLP (US)

(57) ABSTRACT

Embodiments of a search system that provides knowledge based searching of content based on a knowledge model created from the content being searched are disclosed. Embodiments of such search systems may build a model of entitles and relationships representing the collective knowledge contained in a set of content analyzed. When a search is performed on content the model may be leveraged to improve the accuracy, relevance and recall of the search.

16 Claims, 10 Drawing Sheets

Legend: | Publication | Author | Company | Brand | Key Message | Location | Industry |

Publication: Property Casualty 360
Date: April 15, 2015
Author: Patricia L. Harman
Headline: Fuel pump issues cause more auto recalls The National Highway Traffic Safety Administration (NHTSA) has announced recalls for two auto manufacturers whose fuel pumps could cause vehicles to stall without warning.

BMW

The first recall involves 18,054 vehicles manufactured by BMW of North America (BMW). The models involved include: certain model year 2014 228i Coupe, M235i Coupe, 320i, 320xi, 328i, 328xi, 335i, 335xi, ActiveHybrid 3, 328xi Sports Wagon, 428i Coupe, 428xi Coupe, 435i Coupe, 435xi Coupe, 428i Convertible, 428xi Convertible, 435i Convertible, 328xi Gran Turismo, 335xi Gran Turismo, and 2015 428i Gran Coupe, 428xi Gran Coupe, and 435i Gran Coupe vehicles.

Improper nickel plating of components within the fuel pump may result in the fuel pump failing, causing the vehicle to stall without warning. BMW will notify the owners and the fuel pumps will be replaced free of charge. BMW expects the recalls to begin April 30, 2015 and owners may contact BMW at 1-800-525-7417 and refer to NHTSA campaign number 15V189000.

Nissan

The 2014 Nissan Rogue is experiencing a similar problem and Nissan North America is recalling 76,242 vehicles manufactured between June 11, 2013 and June 7, 2014. The fuel pump could fail without warning and increase the risk of a crash. The recall is also expected to begin this month and owners may contact Nissan customer service at 1-800-647-7261. Nissan will replace the fuel pumps at no cost to the owner.

Fiat

Fiat Chrysler Automobiles (FCA) has also issued a recall for their model year 2013-2015 500e electric vehicles manufactured between March 27, 2012 and November 1, 2014. If the vehicle goes into "limp mode," a software incompatibility between the Electric Vehicle Control Unit and the Battery Pack Control Module may cause the electric propulsion system to fully shut down, which could cause a stall-like condition for the vehicle. FCA will notify owners and update the software to ensure compatibility between the components. The recall affects 5,660 vehicles and is expected to begin May 15, 2015. Owners may contact FCA customer service at 1-800-853-1403.

Owners concerned their cars may be the subject of a recall may also contact the National Highway Traffic Safety Administration Vehicle Safety Hotline at 1-888-327-4236 (TTY 1-800-424-9153) or go to www.safercar.gov.

FIG. 3

SYSTEMS AND METHODS FOR THE CREATION, UPDATE AND USE OF MODELS IN FINDING AND ANALYZING CONTENT

RELATED APPLICATION(S)

This application claims the benefit of priority to United States Provisional Patent Application No. 62/191,169 filed Jul. 10, 2015, entitled "Systems and Methods for the Creation, Update and Use of Models in Finding and Analyzing Media" by Huddleston et al., which is hereby fully incorporated by reference herein for all purposes.

TECHNICAL FIELD

This disclosure relates generally to improved systems and methods for the analysis and search of content, including media or the like. More particularly, this disclosure relates to embodiments of a model based approach to the search and analysis of content, including the creation, update and use of such models in finding and analyzing such content. Even more specifically, this disclosure relates to embodiments of systems and methods for the creation of an ontology based on an analysis of content, the updating of such an ontology in the context of the analysis of content and the use of such an ontology in searching content to increase the accuracy, recall and relevance of search results.

BACKGROUND

In the online space where content is widely distributed, and turnover of content is frequent, the search and analysis of such content is difficult. These circumstances have not, however, made the accurate searching and analysis of online content any less desirable. A microcosm of this problem occurs in the context of companies and online earned media.

Earned media (or free media), which is publicity gained through methods or promotional efforts other than paid advertising, may be especially important to companies or other entities as it may be a cost effective way to market products or services that engenders some degree of trust in consumers. Assessment of earned media with respect to a given entity may be a difficult proposition for a variety of reasons, not the least of which is the lexical complexity of languages. For example, when an entity of interest is a common word or has many homonyms (e.g., the word "apple" may refer to the company "Apple", a piece of fruit, etc.) it may be difficult to separate out relevant earned media from other content. Accordingly, the current methods for assessment of searching and analysis of content have proved woefully inadequate in meeting the desires of companies or other entities with respect to locating and assessing associated earned media.

As may be imagined, these issues are not confined to the earned media context. Thus, while earned media provides a relevant example for describing the inadequacies of these current systems, these inadequacies are not just germane to the example of earned media, but indeed are almost universally applicable across any online, networked environment where the search and analysis of electronic content is of importance.

In the main, the problems discussed exist because the current systems and methods for search or analysis of content utilize what is basically a brute force keyword search to determine relevant content. The reliance on keyword searching means that returned search result contain a large number of false positives (e.g., content that is returned that contains search term(s) but is not relevant) and omits a number of false negatives (relevant content that exists but is not returned in response to the search). To again utilize the earned media space as an example, when the company Apple wants to find earned media they do not want to see articles dealing with apples (the fruit) or other businesses that have the word apple in the name.

As a consequence, analyzing and finding desired content is currently a time-consuming and error prone process. What is desired are improved systems and methods for the search and analysis of online content.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3 depicts an example article.

SUMMARY

Figure 1:
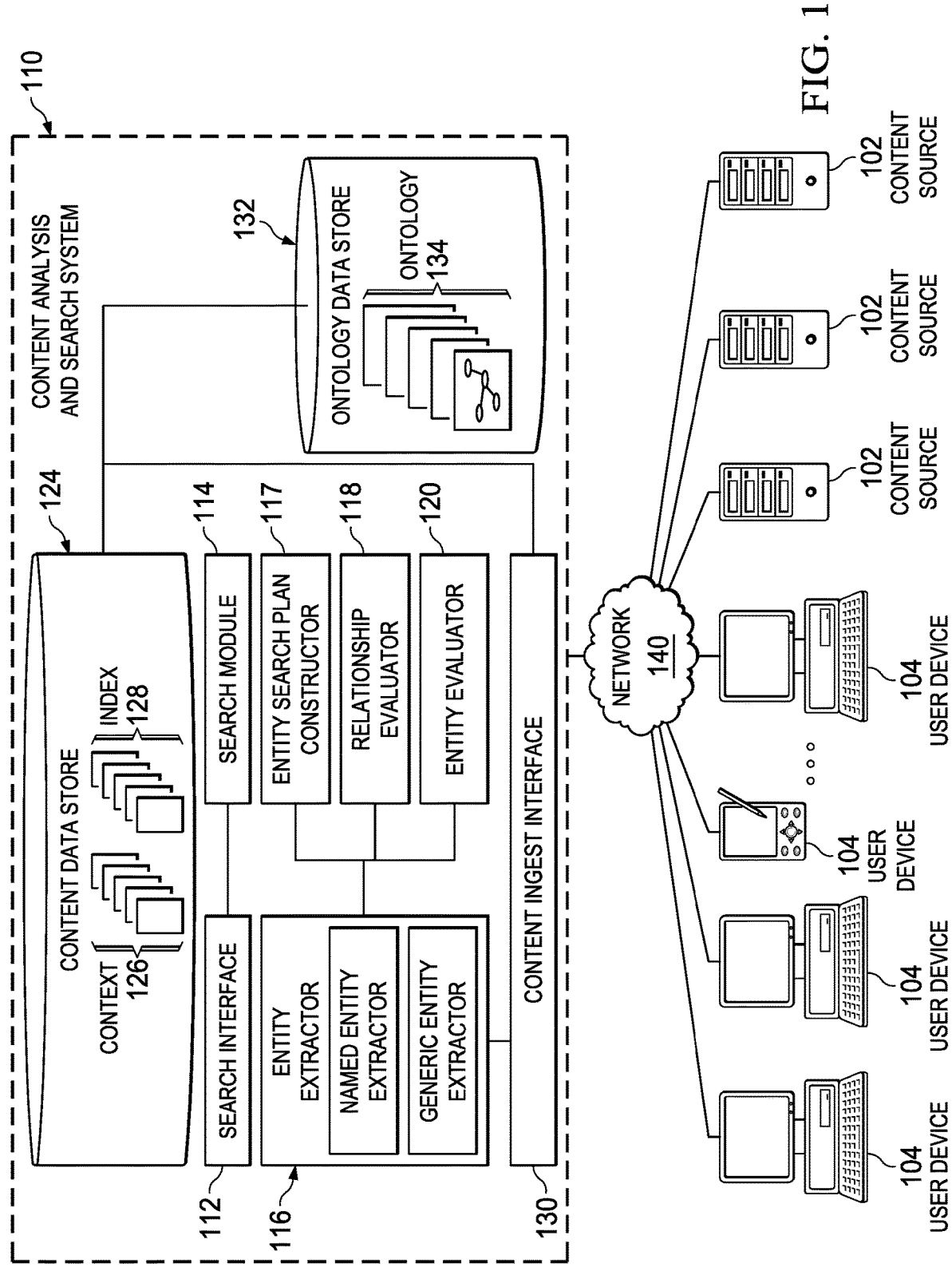
FIG. 1 is a diagrammatic representation of an embodiment of a system and architecture for a content analysis and search system.

Embodiments as disclosed herein substantially ameliorate many of the complications of the current ways of finding and analyzing content by leveraging the knowledge contained in the content itself to improve the analysis and search on that (or other) content. Specifically, embodiments may analyze content to build or update a model related to a set of entities. These entities may be named entities (such as companies, brands, industries, people, locations, publications, etc. as examples in the media context) or generic entities (sometimes referred to as topics). The model may represent the collective knowledge contained in the set of content analyzed. For example, a model may be an ontology that represents entities and the relationships between these entities.

When a search is performed on content (either analyzed content, a different set of content, or a combination of analyzed and other content) the model may be leveraged to improve the relevancy of the search. For example, when a search is received the ontology may be used to expand the entities of the search by finding entities related to the original search entities. The related entities may be used in conjunction with the original entities of the search to determine content relevant to the original search. This type of knowledge based searching enables embodiments as disclosed herein to uncover more relevant content and to more effectively exclude non-relevant content. Thus, embodiments may greatly increase the accuracy of such searches and reduce the time and effort for finding and analyzing content. These capabilities, in turn, lead to more relevant results with fewer false positives and false negatives. In the earned media context these capabilities may enable deeper insights into the effectiveness of public relations efforts of a company and its competitors (e.g., which key messages and themes are associated with a brand or company, etc.).

In this manner, by analyzing a body of content and modeling the knowledge of this body of content, the collective knowledge contained within the body of content may be effectively leveraged to increase the relevancy of searches performed on that (or other) content. Advantageously, as the amount of media analyzed by the system increases the model increases in scope and accuracy and, commensurately, the accuracy, relevance and recall of search results also increase. In contrast with other solutions then, the presence of a greater amounts of content to search serves not as a hindrance to embodiments as disclosed herein but, instead, serves both to increase the knowledge of the system (as represented by the model) and to increase the relevancy, accuracy and recall of the system (e.g., of the search results returned).

Moreover, embodiments may provide the advantage that the model may be updated based on one or more articles of content, with the knowledge of a single article of content adding to the knowledge represented in the model. This level of granularity greatly increases the efficacy of the search systems and methods employing such a model relative to other techniques (e.g., those that utilize machine learning or the like) as a large body of documents is not needed to train (or retrain) the system.

Additionally, embodiments may have improved relevancy (e.g., usefulness or responsiveness to initiator of a search), recall (e.g., the number of documents retrieved by a search) and accuracy or precision (e.g., the fraction of retrieved documents that are relevant). Part and parcel with these improvements is that the relevancy, recall and accuracy of the entire body of content that is returned in response to a search reflects these improvements. Thus, embodiments of searching systems that employ models as disclosed herein may be effectively utilized to compare or analyze bodies of documents (or the contents thereof). For example, different bodies of documents returned in response to the same search over different time periods, or bodies of documents returned in response to the same search associated with a named entity (e.g., a body of documents returned in response to a search for "recall" in association with the named entity Ford may be compared with a body of content returned in response to a search for "recall" in association with Toyota). The usefulness of embodiments in comparing these bodies of documents is wholly different from the concerns and usefulness of other search systems, which are typically concerned with providing a ranked and ordered list of responsive documents and are unconcerned with the measurement of entire bodies of content (e.g., vis-à-vis other bodies of content).

Moreover, embodiments may have the advantage that the knowledge base may be utilized both to prompt a searcher for additional information based on a searcher's specified terms or context or to constrain a search interface presented to the user based on the search context and the model such that the knowledge of the model pertaining to the entities related to the search context may be reflected both in the interface presented and the search terms gathered from the searcher. By prompting a searcher for, and obtaining, search terms relative to a searcher's desired context, subsequently performed searching may be more effectively conducted.

By performing searches for content, and in particular earned media, in this manner the number of articles found that are not relevant may be reduced while also reducing the number of articles missed by relying on search by keyword. Take for example a search for news related to a retail company. Just using keyword searching for the company will return many results that have nothing to do with the company especially if that company includes a common word in its name (e.g., Target, Apple, etc.). Embodiments as disclosed herein may cut through the irrelevant results by retrieving articles where the company that is the subject of the search is an entity. By using a relevancy threshold the articles presented can be refined to include results where the company is more than just a passing mention. It will also bring in more results that may have been missed, such as articles that do not mention the company directly, but do mention a brand affiliated with Target or an executive of the company.

Embodiments that may exhibit some of these advantages may therefore include a search system that provides knowledge based searching of content based on a knowledge model created from the content being searched. Embodiments of such a search system may comprise a data store including content comprised of a set of articles, and an index having an entry for each of the set of articles. Another data store may include an ontology modeling entities and relationships of the content, where each relationship has an associated strength value determined based on the content. These search systems may also include an entity extractor for receiving an article from a content source over a network, determining a set of entities from the article, and determining proximity data associated with the set of entities from the article, where the proximity data includes relative positional information for the entities. An entity evaluator may receive the set of entities of the article and the proximity data, determine an entity score for each of the set of entities and save each of the set of entities and the associated entity score in an entry in the index associated with the article.

Similarly, in certain embodiments a relationship evaluator may receive the set of entities of the article and the proximity data, determine a set of relationships between each of the set of entities of the article, determine an article strength for each of the set of relationships based on the proximity data associated with the set of entities, and update the ontology. Updating the ontology may comprise updating the strength of each relationship of the set of relationships in the ontology based on the article strength for that relationship.

The search system may also include a search interface to receive one or more search entities through the search interface, determine an initial set of articles based on the index where for each of the initial set of articles the entry in the index associated with that article includes at least one of the search entities, determine a relevancy score for each of the initial set of articles using the entity score for each of the one or more search entities in the entry in the index for that article and the relationship strength for each relationship between any of the one or more search entities from the ontology, rank the initial set of articles by the relevancy score, and return the ranked set of articles through the search interface.

Certain embodiments may determine the initial set of articles by accessing the ontology to determine one or more related entities based on the search entities and adding the related entities to the search entities before determining the initial set of articles.

In one embodiment, the set of related entities are related by a relationship with a relationship strength over a threshold relationship strength.

In an embodiment, receiving one or more search entities through the search interface comprises accessing the ontology to determine one or more related entities based on the search entities and refining the search interface based on the one or more related entities to allow the user to add the one or more related entities to the search entities.

In certain embodiments, each of the entities modeled in the ontology is associated with a search plan specific to that entity. This search plan may include a disambiguation array determined from the content, where the disambiguation array includes a set of terms and counter terms. The initial set of articles based on the index may be determined by performing a search of the content based on the disambiguation array using the index.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, it will be helpful to remember the context described above. To summarize, the effective search and analysis of content, including earned media or the like, is highly desirable to enable companies or other entities to gain deeper insight into their exposure, the effectiveness of public relations efforts, the exposure of its competitors, which key messages and themes are associated with a brand or company, and for a variety of other reasons. Previous solutions for searching and analysis have heretofore proved inadequate in meeting these desires. What is needed are improved systems and methods for the search and analysis of content, including media content.

It will be understood throughout this disclosure that though in certain instances embodiments and examples have been described with respect to media (earned and otherwise), this type of content is only one example of content and should be viewed interchangeably with content generally for purposes of those descriptions. In other words, any descriptions given herein with respect to a particular type of content (e.g., such as earned media) do not serve in any way as restrictions on those embodiments or examples applicability to content generally, and should in no way be viewed as restrictions on those embodiments or examples.

To that end, attention is now directed to embodiments of the systems and methods for the search and analysis of content disclosed herein. These embodiments may use the knowledge contained in a body of content to improve the analysis and search of that (or other) content. In particular, content may be received from one or more sources and a model created or updated based on this content. The model thus represents the collective knowledge contained in the body of content and may be, for example, an ontology that represents the entities contained in the content and relationships between those entities.

When a search is performed on content, the model is used in forming or performing the search to improve the relevancy of the search by, for example, expanding the set of entities of the original search or tailoring the search.

Specifically, in some embodiments, the ontology created from the body of content is traversed to find entities related to the original search entities (if such related entities exist) using the relationships between the entities contained in the ontology. The expanded set of entities (e.g., the original search entities and the related entities found based on the ontology) are then used to evaluate the content being searched to determine which content is most relevant to the search. This relevancy may be determined, for example, by scoring content based on the presence of entities within the media and the relationships between the original entities and the related entities present in the media. The content can then be ordered by the score to return the most relevant results (e.g., content with scores over a certain threshold).

The ontology may also be used to amass knowledge about activities with which various entities may be associated or engaged so that a search can be tailored for content regarding these types of activities. In these types of embodiments, the ontology created from the body of content may be accessed to determine an activity type (which may also be referred to as a "BusinessActivity" in certain contexts) associated with a user's search. The knowledge in the ontology associated with the activity type can be used to define or otherwise constrain the user's search such that additional search terms specifically related to that activity type may be obtained from the user to construct a search tailored to that activity type. This tailored search can then be used to evaluate the content being searched to determine which content is most relevant to the tailored search.

In this manner, by analyzing a body of content and modeling the knowledge of this body of content, the collective knowledge contained within the body of content may be effectively leveraged to increase the relevancy of searches performed on that body of (or other) content. Advantageously, as the amount of content analyzed by the system increases the model increases in scope and accuracy and, commensurately, the accuracy, relevancy and recall of the search results also increase. In contrast with other solutions to search then, the presence of a greater amount of content in the corpus serves not as a hindrance to searching for embodiments as disclosed herein but, instead, serves both to increase the knowledge of the system (as represented by the model) and to increase the accuracy, relevancy and recall of the system.

Referring first to FIG. 1 then, one embodiment of an architecture in which embodiments of a content analysis and search system may be deployed is depicted. Content analysis and search system 110 is coupled to one or more user device 104 and content sources 102 over network 140. Network 130 may be the Internet, an intranet, a wireless or wired network, a Local Area Network (LAN), a Wide Area Network (WAN), some combination of these types of computer based networks, etc.

Content sources 102 may be providers of content (e.g., media, articles, or other electronic documents or files) and may be accessed in a variety of manners. For example, a content source 102 may be a content aggregator collecting media from other locations (e.g., from particular web sites) or may be an original generator of such content (e.g., a digital publisher, etc.).

Accordingly, content sources 102 may provide different methods through which the content they provide may be accessed. For example, a content source 102 may provide a web service or the like through which a user (e.g., a machine or human user) of the content source 102 can register such that the user can receive a feed or otherwise be sent content at certain intervals (e.g., nightly, weekly, etc.). This content from content sources 102 may be content of almost any format, including textual content, audio content, video content, etc. For example, a single piece of content may be an article containing such things, as headlines, leads (e.g., the first paragraph of an article), a body (the contents of the article excluding the title, byline and headlines, etc.). For ease of reference herein, a single discrete piece of content may be referred to as an article. It should be understood however, that this term is used for ease of reference only and that embodiments as disclosed herein may be applied equally well to almost any type of content regardless of format or other characteristics.

Content analysis and search system 110 includes content ingest interface 130 through which articles from the content sources 102 can be received (or retrieved) over network 140. For example, as discussed, content analysis and search system 110 may be registered with a content source 102 and that content source 102 may provide articles to content ingest interface 130 of the system 110 at certain intervals. This content ingest interface 130 may itself include a web service or have access to an inbox at a particular web address (e.g., an e-mail address) where articles are sent by the content source 102. These articles may, or may not, be received with accompanying metadata that indicates an author, an original source publication, a time of publication, or other information.

Content ingest interface 130 may then save each article to content data store 124. Content ingest interface 130 may also, in one embodiment, include an indexer such as those known in the art to perform an initial indexing (e.g., term or keyword extraction) and create an initial entry in index 128 for each article with this index data for the article.

Entity extractor 116 is configured to process received articles and extract entity and proximity information from each article. This extraction process may be accomplished using, for example, natural language processing (NLP) or the like. Entities generally refer to a person, place or thing contained in the content of the article and can be commonly grouped into named entities and generic entities (also referred to as topics). Entity extractor 116 may employ one type of module to extract named entities and another type of module to extract generic entities. For example, in one embodiment, entity extractor 116 may employ a Named Entity Recognition and Classification (NERC) module such as LingPipe, ClearForest, Annie, Freeling, Afner, Supersense Tagger, TextPro or YooName to extract named entities. Topics may be extracted using an NLP module such as those offered by MeaningCloud or an extraction library such as Rapid Automatic Keyword Extraction (RAKE) in the Python language. Additionally, topics may be extracted using an NLP module that employs term frequency-inverse document frequency (TF-IDF).

There may be particular types of entities that are relevant to particular domains. For example, in the case of earned media, relevant entities may be companies, brands, key messages (words or phrases from the article that pertain to a main idea of the article), person, industry, location, publication or author. Thus, the entity extractor 116 may also determine the type of the extracted entities, and in particular may determine the type of the extracted named entities.

The proximity information extracted from an article by entity extractor 116 may include a location of entities in the article (e.g., absolute position), location of an entity in an article relative to one or more other entities, including whether they appear in the same sentence or same paragraph (e.g., relative position(s)), part of an article in which the entity appears (e.g., headline, first paragraph, byline, body, etc.) or other absolute or relative positional information regarding an entity.

Content 126 received from the content sources 102 may be stored in content data store 124. Additionally, content data store 124 includes an index 128 that contains data about each article 126 stored in the content data store 124. Index 128 may be used perform a typical search (e.g., a Boolean search comprising one or more keywords, etc.) on the articles in content data store 124. Index 128 contains data (that may include metadata) for a corresponding article that was received with an article or determined from the corresponding article that may be used for searching the article, including for example, the title, the author, the publication date, the publisher, the text of the article (e.g., with stop words removed, etc.), word counts (e.g., frequency of occurrence), or other data.

Data in index 128 for a particular article may also contain an entity score for the corresponding article. The entity score for an article comprises the set of entities which the article contains (e.g., both named and unnamed), as determined by entity extractor 116, and a score for each entity appearing in the corresponding article. Accordingly, by reference to the entry in the index 128 corresponding to an article it can be determined both which entities appear in a particular article and the score for those entities, and conversely for an entity, which articles contain that entity and the score for that entity with respect to that article. Content data store 124, including index 128 and articles 126 may be stored according to a particular configuration or schema. In one embodiment for example, the index may be based on Apache's Lucene index and may be configured according to a Solr or an ElasticSearch schema. Appendix A includes one example of an ElasticSearch schema for an index. Other configurations and schemas are possible and are fully contemplated herein.

Ontology data store 132 includes one or more ontologies 134. This ontology 134 is automatically built and maintained as articles are ingested through the content ingest interface 130. Ontology 134 may be thought of as a graph comprising a number of interrelated nodes. These nodes may include class or concept nodes (collectively concept nodes) defining that class or concept (e.g., a "kind of person, place or thing"). Other nodes in the ontology may be instances of these concept nodes and represent a particular individual instance of that concept. The nodes may be related to another using a variety of relationships that may exist between particular nodes representing different concepts or instances of a concept. Each relationship may therefore be thought of as an edge of a graph that joins at least two (concept) nodes. For example, each instance node may be related to a concept nodes with a relationship that defines that instance node as an instance of that concept node (e.g. with an "IS A" or other type of identity relationship such as "class" or "class of" relationships).

Here, ontology 134 may include entities (e.g., nodes representing entities) and relationships between those entities. As discussed, example entities that are relevant to earned media analysis may be companies, brands, product, product category, crisis, campaign, sponsorship, key messages, key personnel, industries, locations, publications, or authors. Thus, to represent such entities, an entity type node for each of these types of entity may be created (e.g., a concept node for the entity type "Company" may be created). Individual instances of those types of entities may be represented by a node having a relationship with the corresponding entity type node (e.g., an instance node for the company "Apple" may be created and have a "IS A" relationship with the "Company" entity type node).

In certain embodiments, ontology 134 may also include a search plan for each entity, where the search plan is specifically tailored to the entity and is continually refined and updated as articles are ingested. Thus, each entity may have a search plan associated with it and stored as part of the entity node in the ontology 134. In particular, a definition for a default search plan may be associated with an entity type instance node of the ontology 134 and when an entity node is created or updated the search plan for that entity in the ontology may be created or updated specifically for that entity. Such a search plan defines a search pattern than may be used when searching on that entity within the corpus of content 126 maintained by the content data store 124. Thus, the search plan may be specific to that entity and define a search for locating articles associated with that particular entity.

In one embodiment, the search plan may include a search pattern defined by search[CD(T) OR (DA(T1) OR DA(T2) OR . . . DA(TN)) NOT DA(CT1) AND DA(CT2) AND . . . DA(CT3)]. Here, the CD stands for the "core denotation", which may be the minimum way the entity is referred to in articles and may be a case sensitive or insensitive sting value. For example, the company entity Apple, Inc. may have a CD of "Apple". The DA refers to a "disambiguation array". The disambiguation array may comprise "include" terms (T) (e.g., T1, T2 . . . TN) or suppress terms or counter terms (CT) (e.g., CT1, CT2 . . . TN). For example, for an entity of Warrior Sports, Inc. the CD may be Warrior Sports, and the DA for the entity may include the terms apparel, Adidas, Nike, equipment, lacrosse, hockey and the counter terms (CT) "warrior cop", "warrior games" and "ultimate warrior". By using such a search plan, specifically tailored to the entity and built on the cumulative knowledge of the corpus of content, to construct searches for articles related to that an entity, the relevancy, recall and accuracy of content returned in response to those searches may be substantially increased.

Each of the entities represented in the ontology 134 may also have relationships to other entities. To continue with the above example, a company may have products, product categories, brands, key messages, competitors, key personnel, industries, and publications or authors that write about them. A competitor or partner relationship may exist between companies and other companies or brands. Publications cover industries, companies, and brands. Authors write for publications and cover industries, companies, and brands.

The particular type of relationship between any two entities may be based on the type(s) of those two entities. Accordingly, ontology 134 may be able to model multiple types of relationships between entities of the same or different types. For example, if two entities are companies (e.g., the entity nodes are related to the "Company" concept node) one type of relationship between the two entities may be "competitors" while another type of relationship between those same two entities may be "subsidiary", "parent" or "partner". Similarly, ontology 134 may include directed or non-directed relationship. For example, if the relationship between two entities is a "competitors" relationship it may be non-directed, the two companies are competitors of one another. If however, the relationship is a "subsidiary" relationship it is directed, one entity may be the subsidiary of the other entity.

In one embodiment, however, it may be desirable to only maintain that there is a relationship between two entities of a particular type. The type of relationship can be understood or inferred from the type(s) of entities included in the relationship (and thus there may be no need to expressly maintain the type of the relationship in ontology 134, only that there is a relationship). For example, if two entities are both (different) "Company" entities the relationship is understood to be a "competitors" relationship. A relationship between a "Company" entity and a "Brand" entity is understood to be an "owns" relationship (e.g., the company entity owns that brand entity), etc. Thus, ontology 134 includes each entity in the ontology 134 and the type of that entity and each relationship in the ontology 134 where the relationship identifies the two entities that are related.

Moreover, in some embodiments the relationships maintained by ontology 134 may have an associated strength value. This strength value may be a number indicating the perceived strength of the relationship between the two entities represented by the related nodes. As will be discussed in more detail at a later point herein, this strength may be reflective of the frequency with which that relationship is determined to occur in articles, the proximity of the entities in the articles in which the relationship is detected, or other criteria. Accordingly, in one embodiment, ontology 134 may comprise a set of identified entities (e.g., instance nodes for entities) associated with their entity type (e.g., entity type concept nodes) and a set of relationships, where each relationship comprises at least two identified entities and an associated strength value.

Figure 9A:
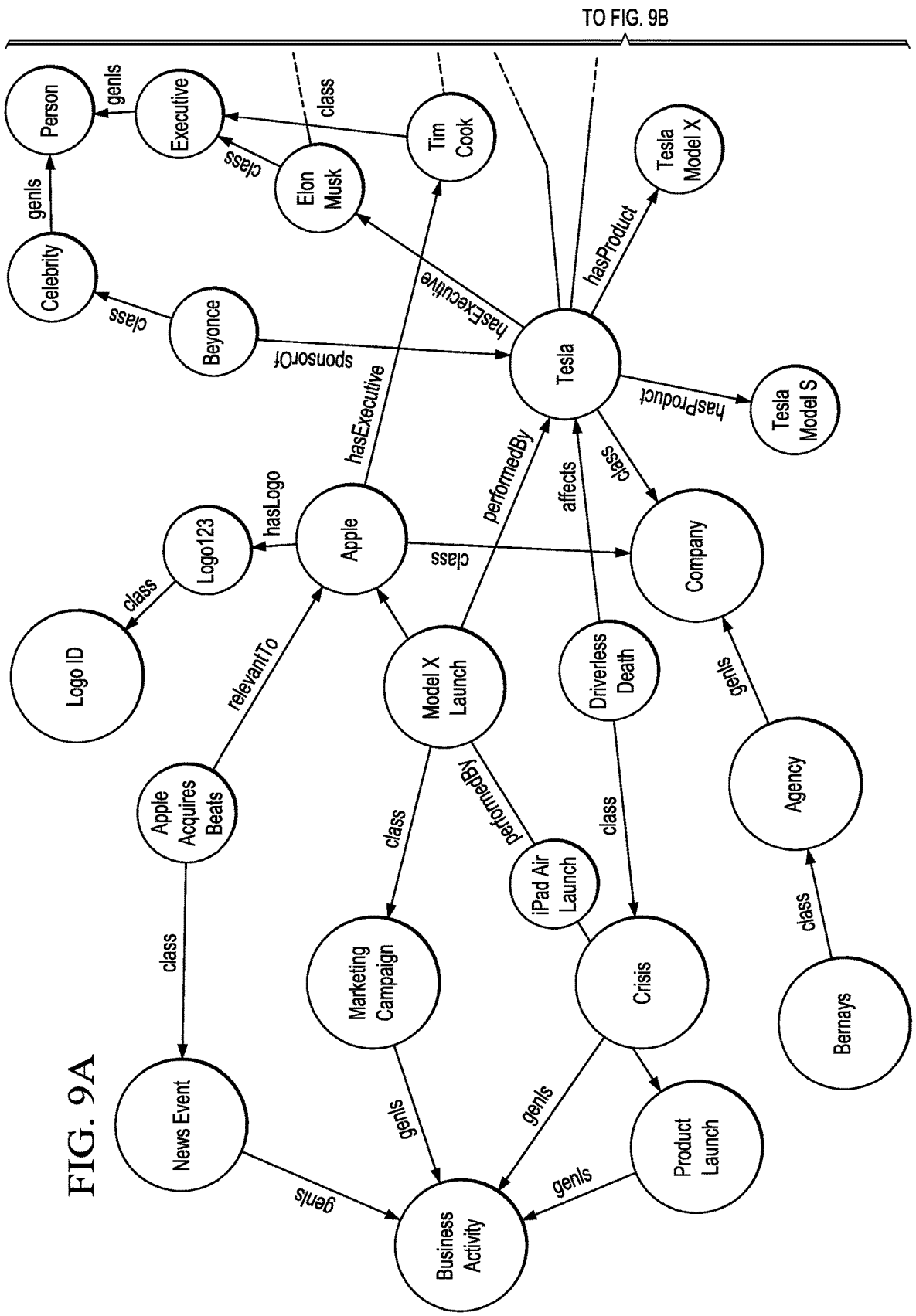
FIGS. 9A AND 9B are a diagrammatic representation of one example of a property graph for an ontology.
Figure 9B:
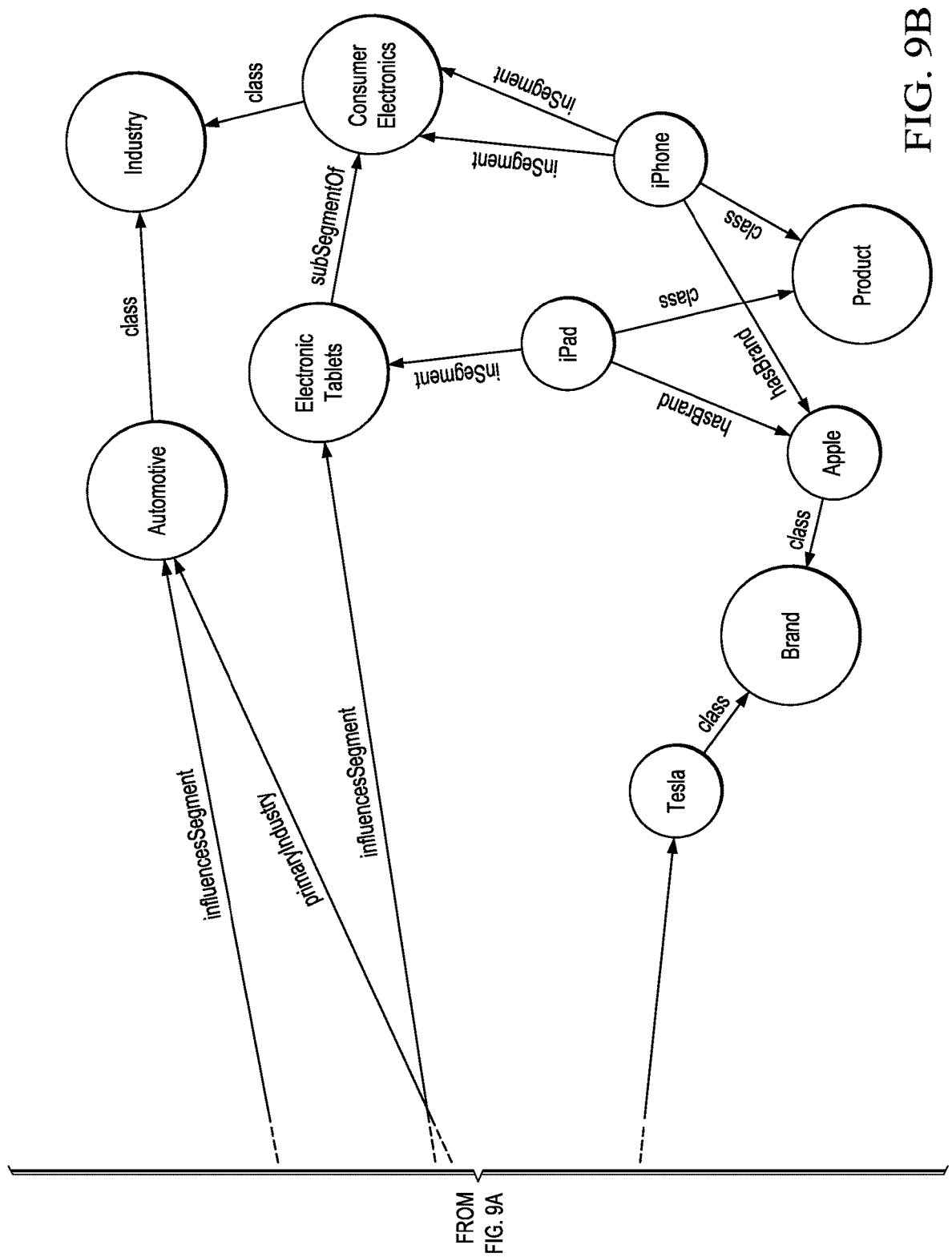

It will be noted that ontology data store 132 (and other storage herein) may be stored in any suitable format and according to any suitable storage, including, for example, a graph store such a Neo4j, a triple store, a relational database, etc. Access and queries to this ontology 134 may thus be accomplished using an associated access or query language (e.g., such as Cypher in the case where the Neo4j graph store is utilized). One example of a property graph for an example ontology is depicted in FIGS. 9A and 9B, along with the corresponding Cypher statements for creating such an example ontology in Appendix B. Here, the example ontology includes named entities and generic entities. For example, generic entities can be seen in the property graph as nodes in '[:genls]' relationships such as (Celebrity)–[:

genIs]→(Person) and on the end point of '[:class]' relationships, such as (ElonMusk)–[:class]→(Executive).

Ontology 134 may also model types of activities associated with entities modeled by the ontology 134. Specifically, these modeled activities may be types of activities that professionals or other individuals involved with modeled entities may be interested in, or perform, such as company crisis, product campaign, product crisis, executive spotlight, brand sponsorship coverage, etc. Thus, the ontology 134 may include one or more activity type instance nodes where each of these activity types (e.g., activity type instance node) may model the activity type by defining what entity types or other data may be associated with that activity type.

The definition may include one or more relationships with an entity type associated with the activity type. Such a definition may be a search plan for that activity type where the search plan is specifically tailored to that activity type and may be continually refined or updated as articles are ingested. Thus, each activity type instance may have a search plan associated with it and stored as part of the activity type node in the ontology 134. This search plan defines a search pattern that may be used when searching for articles related to that activity type.

In a particular embodiment, a search plan for an activity type may include a Boolean pattern comprising one or more entity types and associated roles. Such a search plan may, for example be defined using relationships in ontology 134 that associate the activity type node with the entities of the search pattern, where the relationships associating the search pattern with the entities of the search patter define the roles of those entities.

Accordingly, when an article is received at the media ingest interface 130, it is stored in media data store 124 along with an entry in index 128. The article is also processed by entity extractor 116 which determines the entities in the article, the type of each entity, and proximity information for the entities. The set of entities and the proximity information (and in certain embodiments other data related to the article, such as publication date or other metadata) is then provided to relationship evaluator 118.

Relationship evaluator 118 determines the relationships (if any) between entities in the set of entities and an article strength value for that relationship relative to that article. Generally the more often two entities appear in the same article the stronger the relationship. For example, if companies are often mentioned together they are competitors (or partners). If a company and an industry are often mentioned together then that company is in that industry. If two companies are associated with the same industry then they are likely competitors. The competitive relationship is stronger if the companies are mentioned together than if they are just in the same industry. The relationship is also stronger if the entities are included in the same section of the article (e.g., headline, lead paragraph, body, etc.).

In one embodiment, for an ingested article a relationship is determined between each of the set of entities that are contained in the article (e.g., if there are n entities in a particular article there would be $$\binom{n}{2}$$

relationships). An article strength for each of those relationships can then be determined by scoring the relationship based on frequency and proximity within the article being processed. It will be noted that each type of relationship may be scored according to a different scoring methodology or may be scored according to the same scoring methodology or some combination. Frequency is how many times do the entities of the relationship appear together (e.g., in the document, in a section together, etc.). Proximity is based on where the entities appear together (e.g., in the headline together, in the lead paragraph together, in the same sentence, in the same paragraph, or in the body of the article, etc.).

In particular embodiments, it may be desirable to account for time in scoring the relationships such that older relationships carry less weight (age out) when determining relevancy for a search. In such embodiments, the score for a relationship may be based on time (e.g., in one embodiments, the score for the article strength may be based on the publication date of an article and in particular may be based on the days since a particular date such as Jan. 1, 1970 (the "epoch")). In this manner, a recent indication of a relationship is stronger than a past indication. For example, if Apple and Samsung are in the same article today that carries more weight in determining the strength of the relationship than if they were mentioned one month ago, or one year ago. Greater detail of embodiments of relationship scoring will be discussed at a later point herein.

Once the set of relationships and the article strength for each relationship is determined, the relationship evaluator 118 updates ontology 134. Specifically, relationship evaluator 118 determines if the entities identified for the article are included in the ontology 134. If an entity is not part of the ontology 134 relationship evaluator 118 updates the ontology 134 by adding the entity to the ontology. This update may entail communicating with content data store 124 to construct an entity node in the ontology 134 for that entity and relating it to the appropriate entity type node in the ontology 134.

Relationship evaluator 118 also determines, for each relationship of the article, if the relationship exists in the ontology 134. If it does not exist in the ontology 134, relationship evaluator 118 adds the relationship to the ontology 134 and sets the strength value of the relationship in the ontology 134 to the determined article strength for the relationship. If the relationship currently exists in the ontology, relationship evaluator 118 adds the article strength determined for the relationship to the current strength value for the relationship in the ontology 134. The set of entities in the ontology 134 and their relationships are thus refined, new entities and relationships are discovered, and the strength of the relationship is updated with every article, even if only a single article is ingested.

The set of entities and the proximity information (or any other information) determined by entity extractor 116 is also provided to entity evaluator 120. Entity evaluator 120 determines an entity score for each entity in the article. The score for an entity is based on the frequency of appearance of the entity in the article and the proximity of the appearances of that entity to one another in the article. In one embodiment, each mention of the entity is treated as a separate occurrence of the entity and the entity is scored according to a substantially similar scoring method as a relationships, as will be detailed at a later point herein. The entity scores associated with the article may then be stored in the index 128 corresponding to the article.

Entity search planner 117 may also receive the set of entities and the proximity information (or other information) determined by entity extractor 116. Entity search planner 117 may create or update a search plan for the received set of entities (or other entities) in ontology 134. The creation of a search plan may include the determination of a core denotation for an entity (if an entity does not already have such a core denotation) and generating (e.g., creating or updating) the disambiguation array for the entities, if needed.

As will be discussed in more detail at a later point herein, the entity search planner 117 may utilize a term vector from the corpus of articles ingested and the entire body of content 126 to determine whether terms in the term vector determined from the ingested corpus should be added to the disambiguation array of the search plan for an entity. This determination may be based at least in part on an accuracy associated with adding the term to the disambiguation array. The entity search planner 117 can then update the disambiguation arrays of the search plan in ontology 134 for any of those entities for which it is determined that the disambiguation array should be updated.

Search interface 112 (which may be a web based interface that presents one or more web pages accessed through a browser or may be interface contacted by an application deployed on a user device 104, a proprietary interface as part of a specific application, etc.) allows a user to conduct a search of the content 126 augmented using ontology 134. Specifically, users on user devices 104 may interact with the search interface 112 to provide one or more search terms or search criteria. The search terms may include one or more entities (referred to as search entities) and may include types for those search entities (e.g., an indication that the search term "Apple" is a "Company" entity). The search criteria may include criteria configured to restrict or include the content 126 that is searched. For example, search criteria may include publication data ranges, publication types or names, media source 102 that provided the media, etc.

In one embodiment, search interface 112 may refine the interface presented to the user based on the originally submitted search entities using ontology 134. Specifically, search interface 112 may access ontology 134 to determine entities related to the search entities. These determined related entities may be presented to the user in the search interface to allow the user to select from these entities to add or exclude these entities to form the search. The related entities may be presented by entity type.

For example, if a user searches for an entity, the search interface 112 may access the ontology 134 to determine a set of most closely related "Company" entities (e.g., the top ten as determined by highest relationship score) and may revise the interface presented present to the user to include these companies and allow a user to select (or exclude) these company entities in the search. Other possibilities for revision of the search interface based on the ontology are also possible and are fully contemplated herein.

In certain embodiments, search interface 112 may present or refine the interface presented to the user based on the activity types in ontology 134. In these embodiments, the interface 112 may allow a user to select an activity type represented in ontology 134. Alternatively, the search interface 112 may determine an activity type associated with an entity type or entity entered by the user into the search interface. Such an activity type may be determined by accessing ontology 134 to determine one or more activity types related to the entity type or entity in the ontology 134. The search interface may obtain the activity type to determine the search pattern for the activity type as stored in the ontology 134. This search pattern may be used to refine the search interface presented to the user to reflect the search pattern, including presenting an interface by which the user may enter the entity types or entities that may be involved in the activity type or the entities to exclude for that activity type. For example, for a brand crisis activity type the search interface presented by search interface module 112 may include entry boxes or menus for the company, brand and product where the user can enter the appropriate entities to be searched.

The search entities and any search criteria or other keywords specified by the user may thus be received through search interface 112 and provided to search module 114. Search module 114 is configured to determine a set of relevant articles to return to the user based on the search terms (e.g., search entities, criteria or keywords). In one embodiment, search module 114 searches the index 128 to determine all articles in media data that have an entity score for at least one of the search entities (or an entity score that is above a certain threshold, which may or may not vary based on entity type). This set of articles can be ordered based on the entity scores. For example, for each article the entity scores for the search entities contained in that article may be summed to determine a relevancy score for the article and the articles ordered based on the associated relevancy score.

In another embodiment, search module 114 may perform a two-step search process. In the first step, a set of articles is determined initially from index 128. In this first step, the search entities are expanded by accessing ontology 134 to determine a set of related entities for the search. In particular, for each of the search entities, the set of entities for which a relationship exists with that search entity in ontology 134 may be determined. These are the related entities for that search entity.

In one embodiment, only related entities with a relationship having a relationship strength over a certain threshold value may be determined to be related entities for purposes of expanding the original search entities. This threshold value may be user set, established by machine learning, constantly refined or updated, specific to the type of relationship, etc. In any event, the related entities (if any) for each of the original search entities comprise the related entities for the search.

Once the search entities and the related entities for the search are established, the articles 126 in the content data store 124 can be searched using index 128 to determine any articles 126 that contain a search entities or a related entity. In particular, the entity list in the index 128 associated with each article 126 can be searched to determine which articles 126 contain one of those entities. Again, a threshold value may be utilized such that only articles 126 which contain a search entity or related entity with an associated entity score over the threshold value may be utilized. It will be apparent that different thresholds may be utilized as well. For example, a different threshold may be utilized for an entity score associated with a search entity than for a related entity or different threshold values may be utilized based on the type of search or related entity, etc.

Moreover, in one embodiment, to further increase the accuracy, relevance and recall of the system, the search plan associated with each of the entities may be utilized to determine or refine which articles 126 contain those entities. Thus, when searching for an entity in articles 126 using index 128 it may not be just determining which articles contain the entity (e.g., which articles have that entity stored in the associated index 128 for that article), but instead which articles of the content are responsive to the search plan. As discussed a search plan for an entity may include a search pattern defined by search[CD(T) OR (DA(T1) OR DA(T2) OR . . . DA(TN)) NOT DA(CT1) AND DA(CT2) AND . . . DA(CT3)]. Thus, the search plan for that individual entity may be utilized when querying the content data store 124 for articles 126 containing a search entity (including a related entity). As such, it is not only the presence of the entity in the index for an article which will be determinative, but additionally the terms of the disambiguation array in the search plan for that entity.

It will be noted, of course, that the search plan or search pattern for each of the search entities or related entities (if any) may be utilized in conjunction with one another. For example, a search for a first search entity (SE1) and first related entity (RE1) may combine the search pattern for the first search entity (SPSE1) and the search pattern for the first related entity (SPRE1), such as ((SPSE1) AND (SPRE1)). In this manner searches may be highly targeted based not only on the set of entities and relationships determined from the corpus of ingested content and represented in ontology 134, but additionally based on the specifically determined data related to each specific entity as determined from the corpus of content and represented in the search plan for each entity (which may also be stored in ontology 134).

In another embodiment, search module 114 may search the content 126 based on an activity type using the entities provided by the user through search interface 112 in association with the entity types defined by that activity type. In particular, the activity type in the ontology 134 may include one or more set of terms (e.g., text strings or the like) or additional search constraints that may be associated with the activity type. The activity type constraints may be included along with the entities for that activity type (e.g., as provided by the user though the search interface) in the search of the content data store 126 to determine relevant articles. For example, the search plan for each of the provided entities may be combined with the activity type constraints (e.g., additional terms) to form a Boolean search to determine a set of relevant articles 126. It will also be noted that the entities associated with the activity type may also be expanded to find related entities (if any) as detailed above, and these related entities may be utilized in conjunction with the search entities for the activity type (and any additional activity type constraints) to determine the relevant set of articles.

Once a set of articles 126 is determined based on the initial search, in one embodiment a relevancy score may be determined by examining the articles and scoring the entities in the search criteria and any related entities (based on the relationship(s) in ontology 134). If any entity in the search criteria are contained in the article (e.g., in index 128 comprising the terms in the article) it receives the entity score as the relevancy score. Additionally, any (other) entities mentioned in the set of articles are scored based on their ontological relationship (as represented in ontology 134) to the entities in the search criteria. Relevancy scores for related entities are determined by taking the relevancy score of the related entity, multiplying it by the relationship strength (e.g., to a search entity), and then dividing it by the current time.

In one embodiment, to generate a relevancy score for an article the entity score for each original entity (e.g., a search entity provided through the search interface 112) in the article is added to the relevancy score (which may have a base or initial value of zero). Additionally, for each pair of original search entities contained in the article where a relationship exists between those two entities in the ontology 134, the entity score for each entity for that article may be multiplied by a relationship multiplier determined based on the relationship strength for that relationship contained in ontology 134. The resulting products can then be summed with the relevancy score.

For each pair of entities contained in the article, where one entity of the pair is an original search entity and the other entity of the pair is a related entity (to an original search entity), the entity score for the related entity of the pair may be multiplied by a relationship multiplier determined based on the relationship strength for that relationship contained in ontology 134, and the resulting product summed with the relevancy score.

In some embodiments, the multiplier may be based on time to account for the freshness of articles (e.g., when they were published) and ensure the relevancy of related entities degrades over time. As discussed herein, in one embodiment, the relationship score may be based on scores calculated for articles determined based on a number of days since the "epoch" (e.g., Jan. 1, 1970). Accordingly, in one embodiment the relationship multiplier may likewise be based on the number of days since the epoch and, in particular may comprise the score of the relationship between the two entities divided by the number of days since the epoch at the time of calculation.

Once the relevancy scores for each of the initial articles are determined, the articles can be order by the relevancy score by search module 114. A set of the highest ranking articles (e.g., the top 20 by relevancy score) may then be returned to the use who initiated the search through search interface 112. To determine which articles to return to a user a relevancy score threshold may also apply where all (or a subset of articles) whose relevancy score is over the relevancy score threshold may be returned to the user.

It may be helpful now to go through embodiments as discussed in greater detail to aid in an understanding of these embodiments. Looking first at FIG. 2, one embodiment of a method for the ingest of content and the update of an ontology within a content analysis and search system is depicted. Initially, at step 210 a set of articles may be received from a content source. For each article, the article may be saved in a data store and initially indexed at step 220. This indexing may include the term extraction, keyword or other types of indexing as is known in the art. An entry in the index with this information can then be created.

The article can then be process to extract entity and positional or proximity information at step 230. This extraction process may be accomplished using, for example, natural language processing or the like. Named entities and generic entities may be extracted differently. For example, in one embodiment, NERC may be employed to extract named entities while topics (generic entities) may be extracted using an NLP module such as those employing TF-IDF.

Each entity and relationship in the article can then be evaluated at step 240 based on the entity and positional information. Generally the more often two entities appear in the same article the stronger the relationship. In one embodiment, a relationship is determined between each of the set of set of entities that are contained in the article (e.g., if there are n entities in a particular article there would be $$\binom{n}{2}$$

relationships). An article strength for each of those relationships can then be determined by scoring the relationship based on frequency, proximity and location (e.g., where in an article the entities appear).

For example, in one embodiment, the article strength for relationships between two entities may be scored according to the following rules:

Both entities appear in a headline of an article together=16 points*number of occurrences One entity appears in the headline, one entity in a lead (or the article)=8 points*number of occurrences One entity in the headline, one entity in the body of an article=4 points*number of occurrences Both entities in lead of the article=4 points*number of occurrences One entity in lead of the article, one entity in body of an article=2 points*number of occurrences Both entities in body of the article in a same sentence=4 points*number of occurrences Both entities in body–same paragraph=2 points*number of occurrences Both entities in body of an article in different paragraph=1 point*number of occurrences In particular embodiments it may be desirable to account for time in scoring the relationships such that older relationships carry less weight (age out) when determining relevancy for a search. In such embodiments, the score for a relationship may be based on time (e.g., in one embodiments, the score for the article strength of a relationship may be based on the publication date of an article and in particular may be based on the days since a particular date such as Jan. 1, 1970 (the "epoch")). To continue with the example above, each of the scores detailed above would be multiplied by the number of days between the particular date and the article publication date.

To illustrate some examples of article relationship scoring the example article as included in FIG. 3 will be utilized (note each that each of these scores below may be multiplied by the article publication date multiplier, which for this example article is 16540 days since epoch). Each of the person, places or thing listed and scored is considered an entity (e.g., BMW, NHTSA, Nissan, Property Casualty, Patricia L. Harman, auto manufacturers, 428i, etc.):

Company entity NHTSA relationship to company entity BMW is scored: NHTSA in Lead, 6 mentions of BMW in body (12 points)+2 mentions of BMW in same sentence (8 points)+1 mention in the same paragraph (2 points)+3 mentions in other paragraph (3 points)=25 points Nissan relationship to NHTSA: Nissan in body, 1 mention of NHTSA in lead (2 points)+1 mention of NHTSA in different body paragraph (1 point)=3 points Article industry is Auto manufacturers, publication is Property Casualty 360, and author is Patricia L. Harman. BMW relationship to auto manufacturers, Property Casualty 360, and Patricia L. Harman and each of their relationship to BMW: 6 mentions in body (6 points)

BMW relationship to brand/product entity 428i Convertible: 1 mention in same paragraph (2 points)=2 points Brand/product 428i Convertible relationship to BMW: 2 mentions in same paragraph (4 points)+4 mentions in different paragraph (4 points)=8 points BMW relationship to key messages in the article:
"Fuel pump issues cause more auto recalls": message in Headline, BMW in body=4 points
"stall without warning": message in same paragraph in body=2 points Each entity mentioned in the article also gets scored using the same relationship scoring algorithm, minus the publication date multiplier. For example, using the example article in FIG. 3:

Company NHTSA: NHTSA in Lead (4 points)+NHTSA in Lead and 1 mention of NHTSA in other paragraph (1 point)=5 points Company BMW: 2 mentions in one paragraph (4 points)+3 mentions in one paragraph (6 points)+6 mentions in 3 mentions in different paragraphs (3 points)=13 points Company Nissan: 4 mentions in one paragraph (8 points)+mentions in 2 paragraphs (2 points)=10 points Brand/product 428i Convertible: 1 mention in 1 paragraph=1 point Location North America: 2 mentions in different paragraphs=1 points Industry Auto Manufacturers: 1 mention in lead=4 points Referring still to FIG. 2, the entity scores for each entity mentioned in the article are updated in the entry in the index corresponding to the article at step 250. Similarly, once the set of relationships and the article strength for each relationship is determined the relationship may be updated in the ontology at step 260. Specifically, it can be determined if the entities identified for the article are included in the ontology. If an entity is not part of the ontology, the ontology can be updated by adding the entity to the ontology. Additionally, if the relationship does not exist in the ontology, the relationship is added to the ontology and the strength value of the relationship in set in the ontology to the determined article strength for the relationship. If the relationship currently exists in the ontology, the article strength determined for the relationship is added to the current strength value for the relationship in the ontology.

Figure 4:
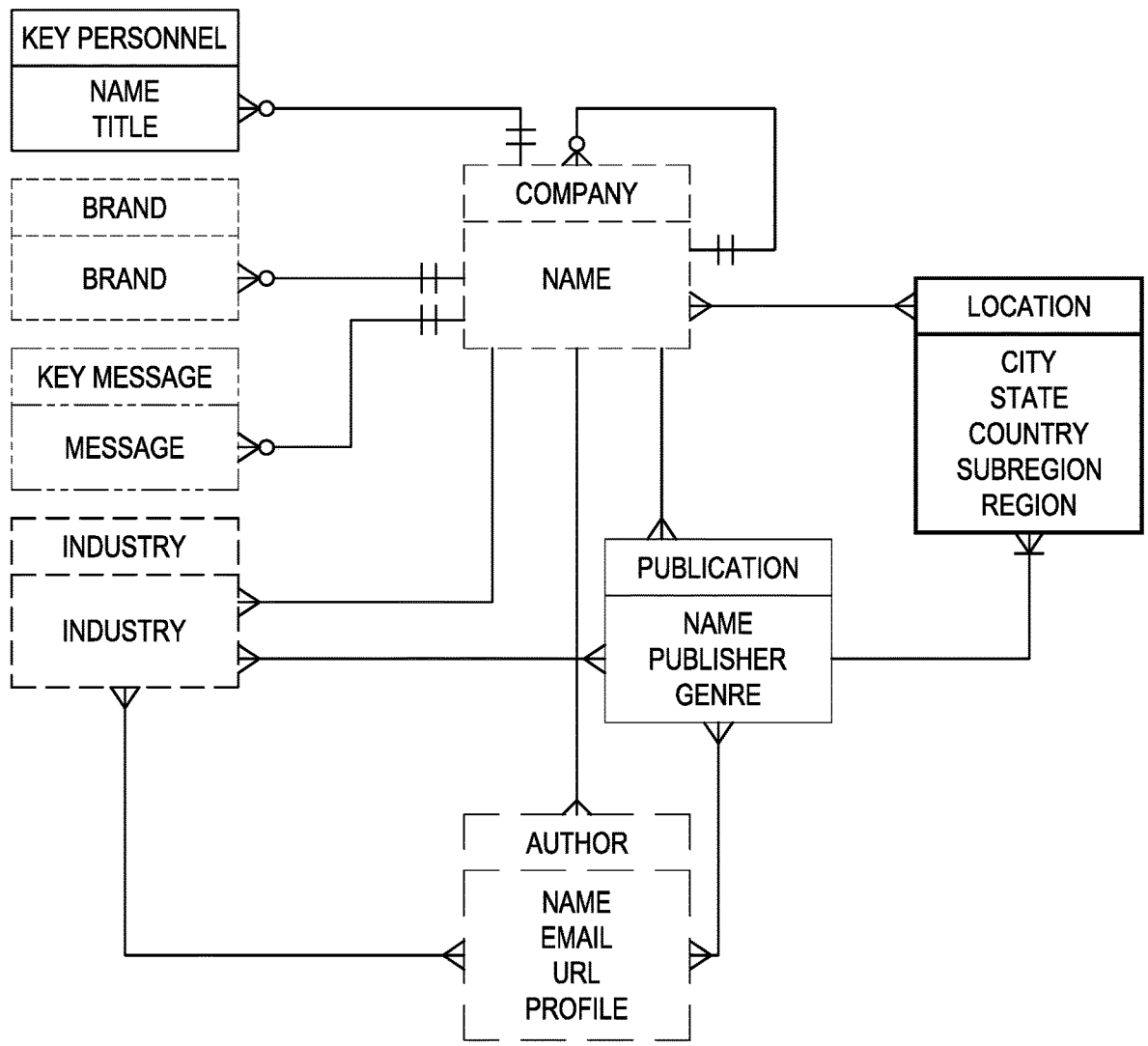
FIG. 4 is a diagrammatic representation of one embodiment of entities and relationships in the earned media context.
Figure 5:
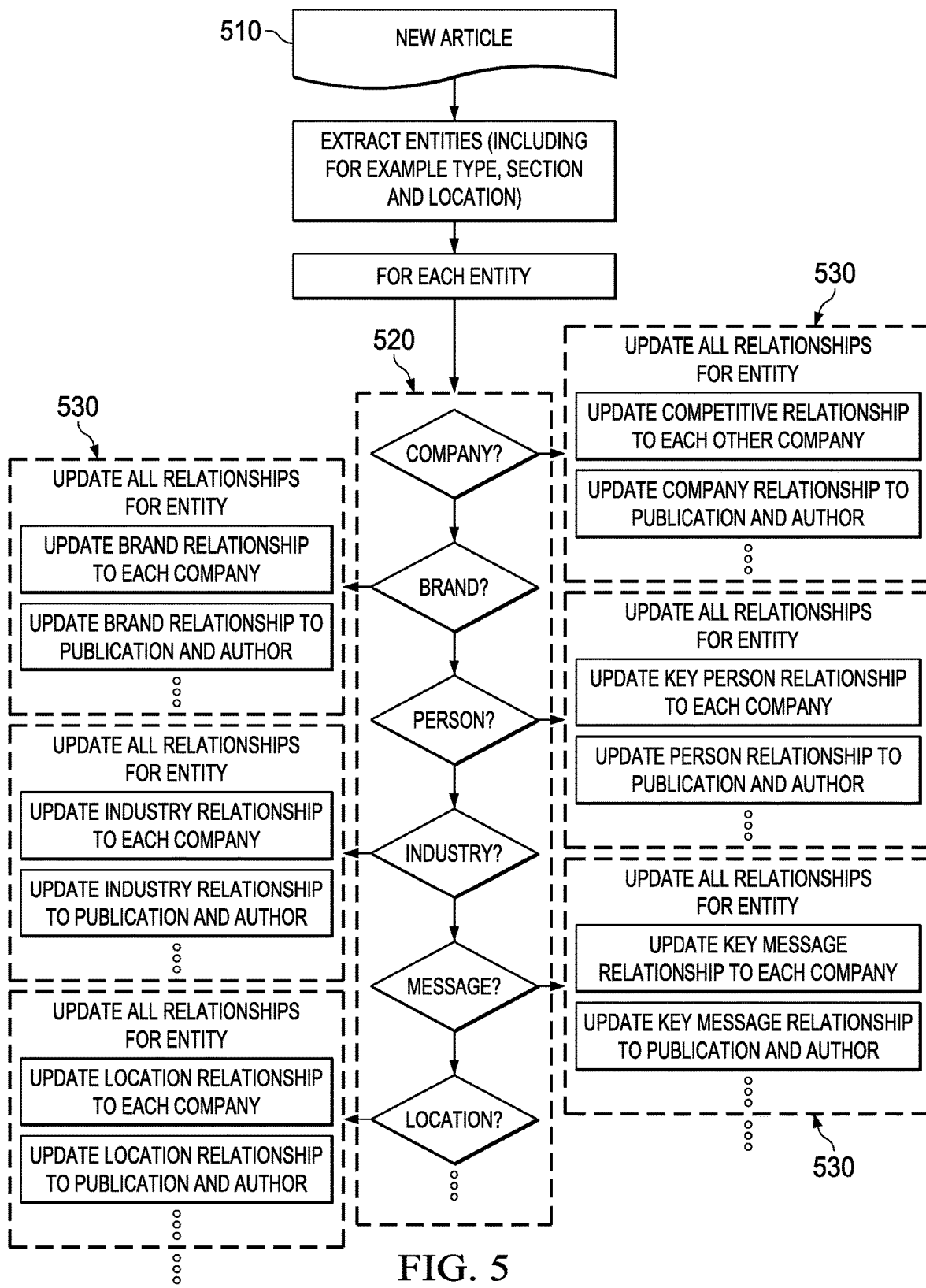
FIG. 5 is a flow diagram illustrating an embodiment of a method of the creation or updating of a model in the earned media context.

Looking briefly at FIGS. 4 and 5, a representation of one embodiment of entities and relationships for earned media is depicted. Here, the relationships may not be named, as only one type of relationship may exist between entities of different (or the same) entity types. In particular, FIG. 4 depicts a general data schema for a simple example in the earned media context entity types may include "Key Personnel", "Brand", "Key Message", "Industry", "Company", "Location", "Publication", and "Author." FIG. 5 depicts one embodiment of a method for updating relationships. Here, at step 510 for a new article the entities and proximity information is extracted and at step 520 for each extracted entity it can be determined what type of entity it is and at step 530 the relationship(s) to each other entity determined at step 520 determined based on the proximity information.

Figure 2:
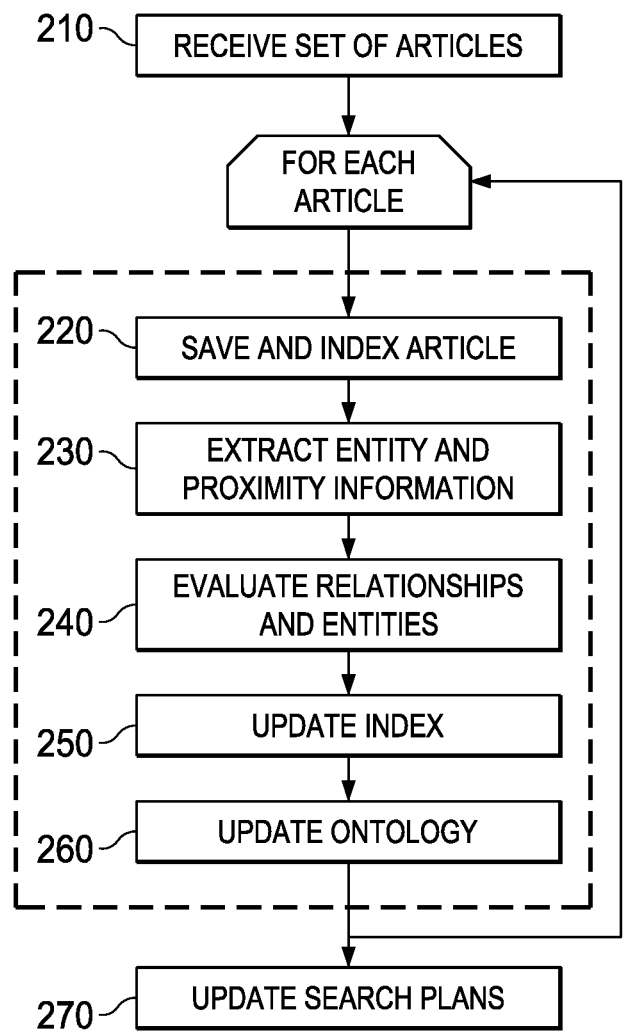
FIG. 2 is a flow diagram illustrating an embodiment of a method for the creation or updating of a model.

Moving back to FIG. 2, once it is determined that all the articles for an article set have been ingested, the search plans in the ontology associated with each entity within that set of ingested articles may be updated at step 270. In particular, the disambiguation array associated with each entity may be updated if needed. In one embodiment, during ingest of the set of articles, a term vector for that set of articles may be built (e.g., by an entity search plan constructor module). This term vector is the set of terms (e.g., entities) sorted by frequency of appearance and may be built using, for example, TF-IDF. For the entities contained in the ingested article set, a set of potential terms can be determined and these terms individually tested to determine whether adding such a term to the disambiguation array for the entity would increase the accuracy of a search related to that entity, or would achieve an accuracy above a certain threshold. This accuracy threshold may be adjusted to achieve a desired accuracy versus recall metric by an operator or other user of the content analysis and search system.

Figure 6:
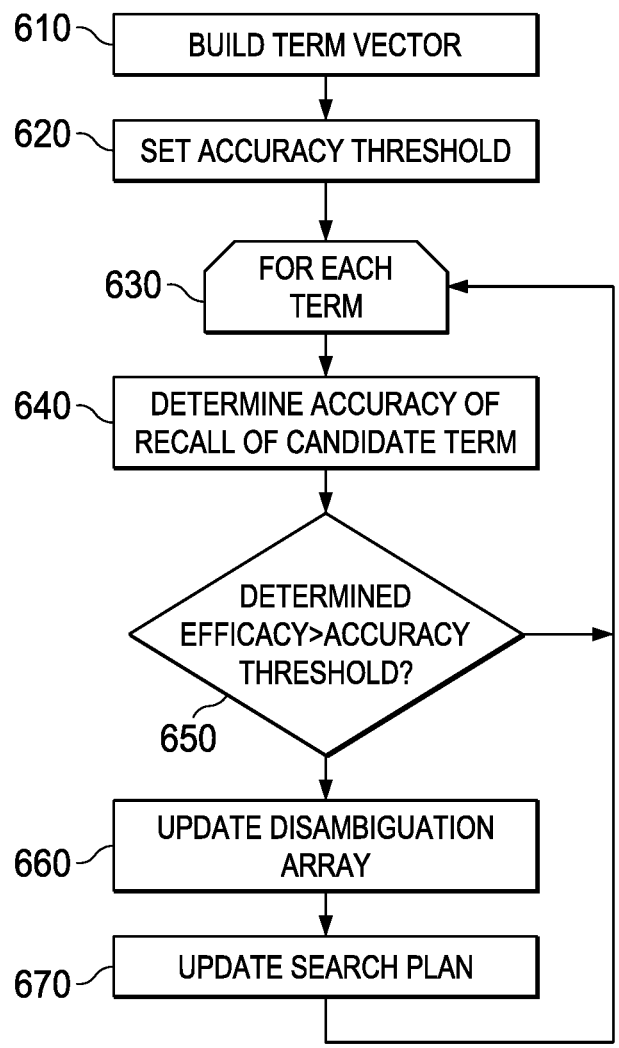
FIG. 6 is a flow diagram illustrating an embodiment of a method of creating a disambiguation array.

One embodiment of a method for the updating of the disambiguation array of a search plan for an entity is depicted in FIG. 6. At step 610, for each entity of a set of articles being ingested a term vector for that entity is created. In particular, an entity set of articles associated with that entity may be determined from the set of ingested articles by searching the ingested set of articles based on the current disambiguation array associated with the entity.

Thus, at step 610 the ontology may be accessed to determine the current disambiguation array associated with the entity in the ontology. The ingested set of articles may then be searched using the terms of the disambiguation array. This search may be a Boolean keyword search for the terms of the disambiguation array with respect to the ingested set of articles (e.g., using OR as the conjunction between the terms). If no disambiguation array for the entity exists (or is empty) a default disambiguation array (of the core denotation for the entity) may be utilized to perform the search.

The entity set of articles is returned in response to the search. This entity set of articles is processed using TF-IDF techniques to determine terms (including phrases) that occur frequently in the ingested set of articles that do not occur frequently in the corpus of content (either the set of ingested articles or the overall corpus of content including all content stored in the system, which may also include the ingested content). These terms are added to an array ordered by frequency of occurrence of these terms in the ingested article set to create the entity term vector.

At step 620, a desired accuracy threshold may be determined. This accuracy threshold may be set by operators or administrators of a content search and analysis system. This accuracy threshold may be adjusted to achieve a desired accuracy versus recall metric by an operator or administrator utilizing the content analysis and search system. For example, in one embodiment this accuracy threshold may be around 90%. Next, at step 630, each term (a candidate term) of the entity term vector may be iterated through to determine if the candidate term should be added to the disambiguation array for that entity. Each of the terms of the entity term vector may be evaluated in order of their ranking in the entity term vector (e.g., the highest weighted or most frequent term tested first, etc.).

In particular, at step 640 the accuracy of recall for a candidate term from the determined entity term vector can be determined. At step 650 the accuracy of recall determined for a candidate term can be compared against the accuracy threshold to determine if it exceeds (or equals or exceeds) the accuracy threshold. If the accuracy threshold is met (or exceeded) at step 660 the disambiguation array may be updated by adding the candidate term to the disambiguation array for that entity, and the search plan for that entity updated with the updated disambiguation array at 670. If the accuracy threshold is not met (or the accuracy of recall for the candidate term is less than or equal to the accuracy threshold), the candidate term may not be added to the disambiguation array and the next candidate term for evaluation determined from the entity term vector at step 630 (if there are any terms that have not been evaluated).

Figure 7:
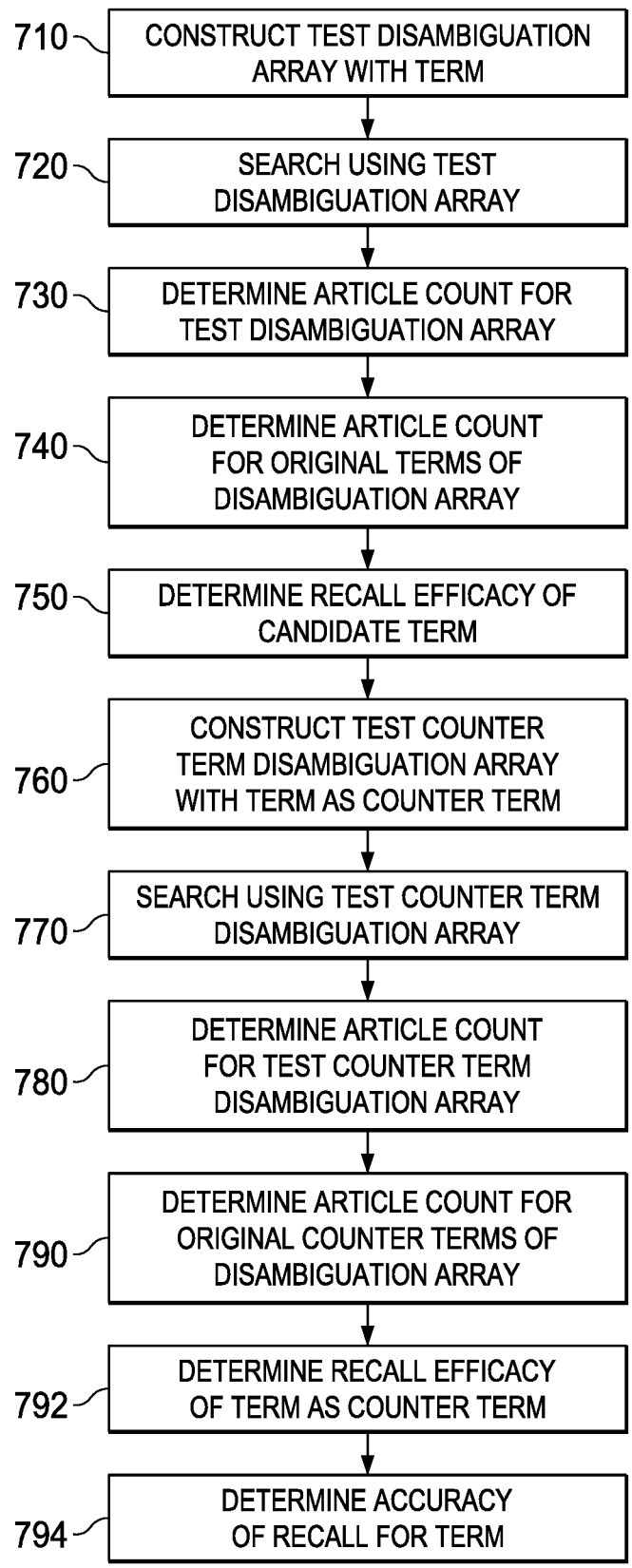
FIG. 7 is a flow diagram illustrating an embodiment of a method of creating determining accuracy of recall of a term.

In one embodiment, the determination of the accuracy of recall for a candidate term from the entity term vector can be determined by adding the candidate term to the current disambiguation array and evaluating the disambiguation array with the included candidate term. FIG. 7 depicts one embodiment of just such a method for evaluating the accuracy of recall of a candidate term. Initially, at step 710 a test disambiguation array may be constructed by appending the candidate term to the current terms of the disambiguation array. This test disambiguation array (da(T)') may be constructed in a non-destructive manner such that the original disambiguation array (da(T)) is not altered or can otherwise be recovered, obtained or accessed.

A corpus of content may then be searched using the terms of the test disambiguation array (da(T)') at step 720. This corpus of documents may be the entire set of content maintained by a content search and analysis system (inclusive or exclusive of a most recently ingested set of articles) or may be just the recently ingested set of articles. The search may be, for example, a Boolean keyword search using an OR operator between each term of the test disambiguation array. The number of article returned in response to this search can then be determined for this search at step 730.

Similarly, an article count for the terms of the original disambiguation array may be determined at step 740 by searching the same corpus of content using the original disambiguation array (da(T)) and determining the number of articles returned in response to this search. Again, the search may be, for example, a Boolean keyword search using an OR operator between each term of the original disambiguation array.

Using the article count for the test disambiguation array and the article count for the original disambiguation array the recall efficacy of the candidate term may be determined at step 750. The recall efficacy of the candidate term is defined by subtracting the article count from the original disambiguation array (da(T)) from the article count for the test disambiguation array (da(T)') and dividing the result by the article count for the original disambiguation array (da(T)).

Next, a test counter term disambiguation array may be constructed by appending the candidate term to the current counter or suppress terms of the disambiguation array (da(CT)) at step 760. This test counter term disambiguation array (da(CT)') may be constructed in a non-destructive manner such that the original counter terms of the disambiguation array (da(CT)) are not altered or can otherwise be recovered, obtained or accessed.

A corpus of content may then be searched using the test counter term disambiguation array (da(CT)') at step 770. This corpus of documents may be the entire set of content maintained by a content search and analysis system (inclusive or exclusive of a most recently ingested set of articles) or may be just the recently ingested set of articles. The search may be, for example, a Boolean keyword search using an OR operator between each counter term of the test counter term disambiguation array. The number of article returned in response to this search can then be determined for this search at step 780.

Similarly, an article count for the original counter terms of the disambiguation array (da(CT)) may be determined at step 790 by searching the same corpus of content using the original counter terms of the disambiguation array (da(CT)) and determining the number of articles returned in response to this search. Again, the search may be, for example, a Boolean keyword search using an OR operator between each counter term of the original disambiguation array.

Using the article count determined by searching with the test counter term disambiguation array and the article count determined by searching with the original counter terms of the disambiguation array, the recall efficacy of the candidate term as a counter term may be determined at step 792. The recall efficacy of the candidate term is defined by subtracting the article count from the counter terms of the original disambiguation array (da(CT)) from the article count for the test counter term disambiguation array (da(CT)') and dividing the result by the article count for the counter terms of the original disambiguation array (da(CT)).

The accuracy of recall for the candidate term can then be determined at step 794 by dividing the recall efficacy of the candidate term when used as a term of the disambiguation array by the sum of the recall efficacy for the candidate term when used as a term of the disambiguation array and the recall efficacy as determined for the candidate term when used as a counter term. This accuracy of recall for the term may then be compared to the accuracy threshold for the system (as discussed above) to determine whether the term should be added as a term to the disambiguation. In some embodiments, this accuracy of recall may also be used to determine if the candidate term should be added as a counter term to the disambiguation array.

As has been discussed hereinabove, embodiments of a content analysis and search system may therefore maintain a corpus of content, where each article of the content has an associated entry in an index. Moreover, the system may maintain an ontology representing the knowledge of the corpus through the entities and relationships contained therein. The content analysis and search system may therefore provide the capability to search the corpus of content where the search may be augmented using the knowledge contained in the ontology. The ontology may be used to both constrain or enlarge a search depending on the context to increase the accuracy, relevance and recall of such search. It may now be useful to discuss embodiments of methods of conducting such searches. These methods may, for example, be employed by embodiments of a search interface or search module of content analysis and search system.

Figure 8:
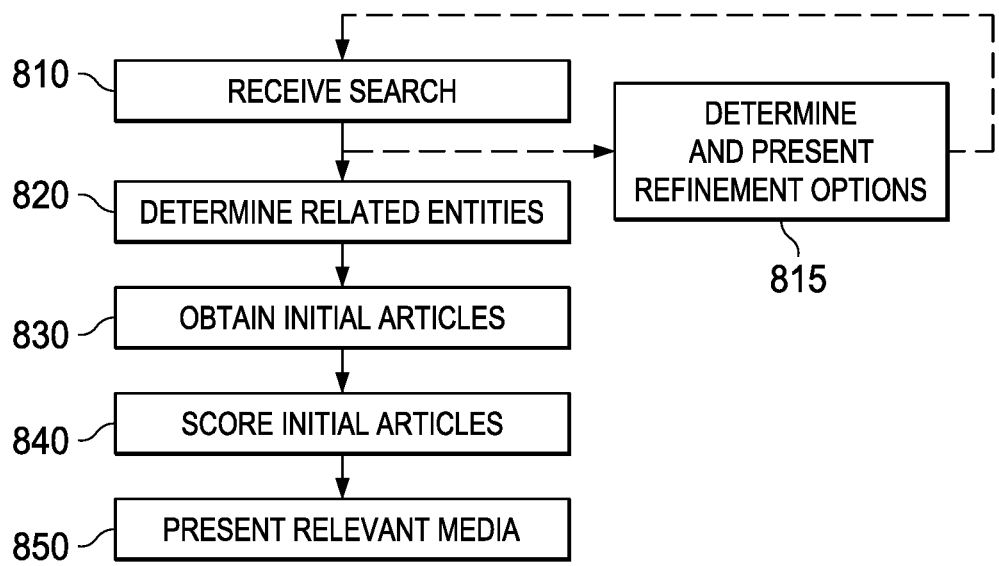
FIG. 8 is a flow diagram illustrating an embodiment of a method for searching content using a model.

Looking then at FIG. 8 a flow diagram of an embodiment of a method for a search of articles within a content analysis and search system is depicted. Initially, at step 810 a search may be received from a user through a search interface. Specifically, users may interact with a search interface to provide one or more search terms, search criteria or keywords. The search terms may include one or more entities (referred to as search entities). The search criteria may include criteria configured to restrict or include articles searched. For example, search criteria may include publication data ranges, publication types or names, media source that provided the media, etc.

Optionally, at step 815, a set of search refinement options may be determined and presented to the user to allow the user to refine (e.g., add to or delete from) the search terms. In one embodiment, the search interface presented to the user may be refined based on the originally submitted search entities using the ontology of the system. In particular, the ontology may be accessed to determine entities related to the search entities. These determined related entities may be presented to the user in the search interface to allow the user to select from these entities to add or exclude these entities to the search, or to otherwise form or edit the search based on these entities.

Generally, a user may submit one or more entities through the search interface. The ontology can be queried (e.g., using the Cypher query language in embodiments where the ontology is stored in a Neo4j graph store) to determine the related entities and their corresponding relationship score. The query may also be configured to only determine certain types of related entities or certain types of relationships based on the context or other criteria associated with the search interface. A certain set of these related entities determined from the query (e.g., all of the related entities, only those with a relationship score over a certain threshold, only entities of a certain type, etc.) may then be presented to the user through the search interface to allow the user to refine the search to include those entities.

For example, if a user searches for an entity, the ontology may be queried to determine a set of most closely related company entities (e.g., the top ten as determined by highest relationship score). The search interface presented to the user may be revised to include these companies and allow a user to select (or exclude) these company entities in the search. Other possibilities for revision of the search interface based on the ontology are also possible and are fully contemplated herein.

In certain embodiments, the search interface presented to a user may be refined based on an activity type represented in ontology. In these embodiments, the search interface may allow a user to select an activity type represented in ontology. For example, a search interface or search module may query the ontology to determine a list of activity types represented in the ontology. This returned list of activity types may be presented to the user in a menu in the search interface (e.g., in drop down menu, etc.) for user selection.

Alternatively, in one embodiment, the search interface or search module of the system may determine an activity type associated with an entity type or entity entered by the user through the search interface. Such an activity type may be determined by querying the ontology to determine one or more activity types related to the type of entity or the entity (entered by the user in the ontology). The search pattern associated with an activity type related to the entity type of the entity can then be determined and used to refine the search interface presented to the user.

In particular, in certain embodiments, the search pattern for an activity type may include the entity types associated with, or related to, the activity type; or may include entity types which should be excluded. For example, the search pattern may include entity types related to the activity type by a "NECESSARY_TYPE" relationship. The activity type represented in the ontology may also include one or more text strings that may be associated with the activity type. The entity types or text strings for the activity type may be used to refine or constrain the search interface such that the user may be presented with input areas for the appropriate entity types for that activity type. The text strings, if any, associated with the activity type may also be presented to the user in the search interface (e.g., in conjunction with the input areas for the input areas for the entity types) so that a user may understand how the entity types are associated or relate to one another with respect to that activity type. For example, for a "brand crisis" activity type the search interface presented may include entry boxes or menus for the company, brand and product where the user can enter the appropriate entities to be searched.

In certain embodiments, the search interface may accept partial strings or the like for entities. The ontology can then be queried using a previously determined activity type and the partial strings for the entities. This query finds entities that match the partial strings and are instances of the entity types associated with the activity type. The search interface presented to the user may then be updated with these entities such that the user can select from amongst them. The user may also be prompted by the search interface to provide text strings to complete or augment a text string associated with the activity type.

Again then, at step 810 a search may be received from a user through a search interface, where this search may, or may not, have been refined or constrained through use of the ontology. The search may thus include one or more search entities, and any other associated search criteria or keywords (e.g., text strings) the user may enter through the search interface. These search entities, search criteria or keywords may thus be used to determine a set of relevant articles to return to the user.

To determine the articles to return, the search entities may be expanded to find a set of related entities by accessing the ontology at step 820. In particular, for each of the search entities, a set of related entities which have a relationship with that search entity in the ontology may be determined by querying the ontology. In one embodiment, only entities having a relationship with the search entity where that relationship has an associated strength over a certain threshold value may be determined to be related entities for purposes of expanding the original search entities. This threshold value may be user set, established by machine learning, constantly refined or updated, specific to the type of relationship, etc.

It will be noted that, in certain instances, the search entities may not be expanded at step 820. For example, if a user has submitted a search in association with an activity type it may not be desirable to expand the search to included entities related to the original search entities using the ontology, as a user may only be interested in that activity type with respect to the provided entities. Alternatively, however, in other embodiments, the search entities associated with the activity type may also be expanded to locate related entities.

Once the search entities and any related entities for the search are determined, articles can be searched using the associated index to determine an initial set of articles at step 830. This initial set of articles may include articles that contain a search entity or a related entity. In particular, the entity list in the index associated with each article can be searched to determine which articles contain one of those entities. A threshold value may be utilized such that only articles which contain a search entity or related entity with an associated entity score over the threshold value may be utilized. It will be apparent that different thresholds may be utilized as well. For example, a different threshold may be utilized for an entity score associated with a search entity than for a related entity or different threshold values may be utilized based on the type of search or related entity, etc.

Moreover, in one embodiment, to further increase the accuracy, relevance and recall of the system, the search plan associated with each of the entities (search entities or related entities) in the ontology (search entities or related entities) may be utilized to determine or refine which articles contain those entities. Thus, when searching for an entity in articles using the index may not be just determining which articles contain the entity (e.g., which articles have that entity stored in the associated index for that article), but instead which articles of the content are responsive to the search plan.

As discussed a search plan for an entity may include a search pattern defined by search [CD(T) OR (DA(T1) OR DA(T2) OR . . . DA(TN)) NOT DA(CT1) AND DA(CT2) AND . . . DA(CT3)]. Thus, the search plan for that individual entity may be utilized when querying a content data store for articles containing a search entity (or a related entity). As such, it is not only the presence of the entity in the index for an article that will be determinative, but additionally the terms of the disambiguation array in the search plan for that entity.

It will be noted, of course, that the search plan or search pattern for each of the search entities or related entities (if any) may be utilized in conjunction with one another. For example, a search for a first search entity (SE1) and first related entity (RE1) may combine the search pattern for the first search entity (SPSE1) and the search pattern for the first related entity (SPRE1), such as ((SPSE1) AND (SPRE1). In this manner, searches may be highly targeted based not only on the set of entities and relationships determined from the corpus of ingested content and represented in the ontology but, additionally, based on specifically determined data related to each specific entity as determined from the corpus of content and represented in the search plan for each entity (which may also be stored in the ontology).

In another embodiment, the corpus of content may be searched based on an activity type using the entities provided by the user through search interface 112 in association with the search plan defined by that activity type. In particular, the search plan for the activity type in the ontology may include one or more set of terms (e.g., text strings or the like) or additional search constraints that may be associated with the activity type. The activity type constraints may be included along with the entities for that activity type (e.g., as provided by the user though the search interface) in the search of the content data store to determine relevant articles. For example, the search plan for each of the provided entities may be combined with the activity type constraints (e.g., additional terms) to form a Boolean search of the corpus of content to determine a set of relevant articles. It will also be noted that the entities associated with the activity type may also be expanded to find related entities (if any) as detailed above, and these related entities may be utilized in conjunction with the search entities for the activity type (and any additional activity type constraints) to determine the relevant set of articles.

After the set of initial articles is determined based on the search entities and related entities (if any) and the associated entity scores, a relevancy score may be determined for each of those initial articles at step 840. This relevancy score for an article may be determined based on the entity score for each of the original search entities (if any) or related entities (if any) contained in the article and the relationship score(s) between any original entities and related entities.

For example, in one embodiment a relevancy score may be determined by examining the articles and scoring the entities in the search criteria and any related entities (based on the ontological relationship). If any entity in the search criteria is mentioned in the article it may receive the entity score as the relevancy score.

Additionally, any entities mentioned in the set of articles are scored based on their ontological relationship to the entities in the search criteria. Relevancy score for related entities are determined by taking the relevancy score of the related entity, multiplying it by the relationship strength, and then dividing it by the current time (in embodiments where time is being utilized in the scoring).

In one embodiment, to generate a relevancy score for an article the entity score for each original entity in the article is added to the relevancy score (which may have a base or initial value of zero). Additionally, for each pair of original search entities contained in the article where a relationship exists between those two entities in the ontology, the entity score for each entity may be multiplied by a relationship multiplier determined based on the relationship strength for that relationship contained in ontology and the resulting products summed with the relevancy score.

For each pair of entities contained in the article where one entity of the pair is an original search entity and the other entity of the pair is a related entity, the entity score for the related entity of the pair may be multiplied by a relationship multiplier determined based on the relationship strength for that relationship contained in ontology and the resulting product summed with the relevancy score.

In some embodiments, the multiplier may be based on time to account for the freshness of articles (e.g., when they were published) and ensure the relevancy of related entities degrades over time. As discussed herein, in one embodiment, the relationship score may be based on scores calculated for articles determined based on a number of days since the "epoch" (e.g., Jan. 1, 1970). Accordingly, in one embodiment the relationship multiplier may likewise be based on the number of days since the epoch and, in particular, may comprise the score of the relationship between the two entities divided by the number of days since the epoch at the time of calculation.

It may help to illustrate using a concrete example. Assume for purposes of this example that 1) the user has submitted two search entities: Fiat and BMW in a search; 2) a third entity Nissan is determined to have a relationship to both Fiat and BMW from the ontology; 3) there is an article in the initial set of articles that has BMW with an entity score of 30, Fiat with an entity score of 20 and Nissan with an entity score of 10. The score for that article would be determined as by summing the following components: BMW entity score (30); Fiat entity score (20), BMW→Fiat relationship (30×BMW/Fiat relationship multiplier); Fiat→BMW relationship (20×BMW/Fiat relationship multiplier); Nissan→BMW relationship (10×Nissan/BMW relationship multiplier); and Nissan→Fiat relationship (10×Nissan/Fiat relationship multiplier).

Once the relevancy scores for each of the initial set of articles are determined, the set of articles can be order by the relevancy score and returned to the user at step 850. For example, a set of the highest ranking articles may be returned to the use who initiated the search through the search interface or a relevancy score threshold may also apply where all (or a subset of articles) whose relevancy score is over the relevancy score threshold may be returned to the user.

By performing searches for content, and in particular media (including earned media) according to embodiments herein, the number of articles found that are not relevant may be reduced while also reducing the number of articles missed by relying on non-semantic search by keyword (e.g., recall may be increased). Embodiments as disclosed herein will cut through irrelevant results by locating articles where the company that is the subject of the search is an entity. By using a relevancy threshold the articles presented can be refined to include results where the company is more than just a passing mention. It will also bring in more results that may have been missed, such as articles that don't mention the company directly, but do mention a brand affiliated with target or an executive of the company.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing device (e.g., other native components, etc.).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

APPENDIX A

Sample ElasticSearch Article Schema

```
"TrendKiteArticle": {
    "dynamic_templates": [
        {
            "doubles": {
                "mapping": {
                    "type": "double"
                },
                "match": "*_d"
            }
        },
        {
            "longs": {
                "mapping": {
                    "type": "long"
                },
                "match": "*_l"
            }
        },
        {
            "dates": {
                "mapping": {
                    "type": "date"
                },
                "match": "*_date"
            }
        },
        {
            "strings": {
                "mapping": {
                    "type": "string",
                    "fields": {
                        "raw": {
                            "index": "not_analyzed",
                            "type": "string"
                        }
                    }
                },
                "match": "*_s"
            }
        }
    ],
    "properties": {
        "summary": {
            "type": "string"
        },
        "themes_keywords": {
            "index": "not_analyzed",
            "type": "string"
        },
        "sourcecategory": {
            "index": "not_analyzed",
            "type": "string"
        },
        "custom_positive_sentiment_ll": {
            "type": "string"
        },
        "social_date_dt": {
            "format": "dateOptionalTime",
            "type": "date"
        },
        "editorial_topics": {
            "index": "not_analyzed",
            "type": "string"
        },
        "topics_json": {
            "index": "not_analyzed",
            "type": "string"
        },
        "url_direct": {
            "index": "not_analyzed",
            "type": "string"
        },
        "wordCount": {
            "type": "long"
        },
```

Sample ElasticSearch Article Schema (continued)

```
        "companiescompanyname": {
            "index": "not_analyzed",
            "type": "string"
        },
        "content": {
            "type": "string",
            "fields": {
                "raw": {
                    "analyzer": "standard_no_stopwords_no_lowercase",
                    "type": "string"
                }
            }
        },
        "companiescompanyprimary": {
            "type": "boolean"
        },
        "topic_name": {
            "index": "not_analyzed",
            "type": "string"
        },
        "data_source_s": {
            "index": "not_analyzed",
            "type": "string"
        },
        "language": {
            "index": "not_analyzed",
            "type": "string"
        },
        "sentiment_value": {
            "type": "float"
        },
        "url_path_sections": {
            "type": "string"
        },
        "publisher": {
            "index": "not_analyzed",
            "type": "string"
        },
        "title": {
            "type": "string",
            "fields": {
                "raw": {
                    "analyzer": "standard_no_stopwords_no_lowercase",
                    "type": "string"
                }
            }
        },
        "article_id": {
            "index": "not_analyzed",
            "type": "string"
        },
        "description_s": {
            "type": "string"
        },
        "dataFormat": {
            "index": "not_analyzed",
            "type": "string"
        },
        "publisher_url": {
            "index": "not_analyzed",
            "type": "string"
        },
        "country_code": {
            "index": "not_analyzed",
            "type": "string"
        },
        "themes_json": {
            "index": "not_analyzed",
            "type": "string"
        },
        "genre": {
            "index": "not_analyzed",
            "type": "string"
        },
        "topicstopicgroup": {
            "index": "not_analyzed",
            "type": "string"
        },
```

APPENDIX A-continued

Sample ElasticSearch Article Schema

```
        "image_url": {
            "index": "not_analyzed",
            "type": "string"
        },
        "commentsUrl": {
            "index": "not_analyzed",
            "type": "string"
        },
        "site_urls_ll": {
            "type": "string"
        },
        "entities_keywords": {
            "index": "not_analyzed",
            "type": "string"
        },
        "phrases_json": {
            "index": "not_analyzed",
            "type": "string"
        },
        "authorname": {
            "index": "not_analyzed",
            "type": "string"
        },
        "topic_group": {
            "index": "not_analyzed",
            "type": "string"
        },
        "country": {
            "index": "not_analyzed",
            "type": "string"
        },
        "lang": {
            "index": "not_analyzed",
            "type": "string"
        },
        "id": {
            "type": "long"
        },
        "topics_keywords": {
            "index": "not_analyzed",
            "type": "string"
        },
        "author": {
            "index": "not_analyzed",
            "type": "string"
        },
        "publish_date": {
            "format": "dateOptionalTime",
            "type": "date"
        },
        "twitter_1": {
            "type": "long"
        },
        "sourceid": {
            "type": "string"
        },
        "topicstopicname": {
            "index": "not_analyzed",
            "type": "string"
        },
        "companiescompanyisin": {
            "index": "not_analyzed",
            "type": "string"
        },
        "mediatype": {
            "index": "not_analyzed",
            "type": "string"
        },
        "entities_json": {
            "index": "not_analyzed",
            "type": "string" [{
                "title": "string",
                "type": "type",
                "evidence": "long",
                "confident": "boolean",
                "label": "url",
                "entityType": "type",
                "isAbout": "boolean",
                "sentimentScore": "float",
                "sentimentPolarity": "positive",
                "relatedEntity": "entities_json",
                "relatedEntityStrength": "long",
                "relatedEntityProximity": "long",
            },
        }
    }
}
```

APPENDIX B

Sample Property Graph Definition in Cypher Language

```
CREATE (Tesla:Company {name: 'Tesla', layer: 1})
CREATE (Apple:Company {name: 'Apple', layer: 1})
CREATE (AppleBrand:Brand {name: 'Apple', layer: 1})
CREATE (TeslaBrand:Brand {name: 'Tesla', layer: 2})
CREATE (IPhone:Product {name: 'iPhone', layer: 1})
CREATE (IPad:Product {name: 'iPad', layer: 2})
CREATE (Automotive: Industry {name: 'Automotive'})
CREATE (ConsumerElectronics:Industry {name:'Consumer Electronics', layer: 1})
CREATE (ElectronicTablets:Industry {name: 'Electronic Tablets'})
CREATE (Bernays:Agency {name: 'Bernays'})
CREATE (Beyonce:Celebrity {name: 'Beyonce'})
CREATE (ElonMusk:Executive {name: 'Elon Musk'})
CREATE (TimCook:Executive {name: 'Tim Cook'})
CREATE (ModelXLaunch:MarketingCampaign {name: 'Model X Launch'})
CREATE (DriverlessDeath:Crisis {name: 'Driverless Death'})
CREATE (AppleAcquiresBeats:NewsEvent {name: 'Apple Acquires Beats'})
CREATE (IPadAirLaunch:ProductLaunch {name: 'iPad Air Launch'})
CREATE (TeslaModelS:Brand {name: 'Tesla Model S'})
CREATE (TeslaModelX:Brand {name: 'Tesla Model X'})
CREATE (LogoID123:LogoID {name: 'Logo123'})
CREATE (Industry:Collection {name:'Industry'})
CREATE (Company:Collection {name: 'Company'})
CREATE (Agency:Collection {name: 'Agency'})
CREATE (Brand:Collection {name: 'Brand'})
CREATE (Product:Collection {name: 'Product'})
CREATE (Person:Collection {name: 'Person'})
CREATE (Celebrity:Collection {name: 'Celebrity'})
CREATE (Executive:Collection {name: 'Executive'})
CREATE (BusinessActivity:Collection {name: 'Business Activity'})
CREATE (MarketingCampaign:Collection {name: 'Marketing Campaign'})
CREATE (Crisis:Collection {name: 'Crisis'})
CREATE (NewsEvent:Collection {name: 'News Event'})
CREATE (ProductLaunch:Collection {name: 'Product Launch'})
CREATE (LogoID:Collection {name: 'Logo ID'})
CREATE (Automotive) -[:class]-> (Industry)
CREATE (Tesla) -[:class]-> (Company)
CREATE (Apple) -[:class]-> (Company)
CREATE (IPadAirLaunch) -[:class]-> (ProductLaunch)
CREATE (Bernays) -[:class]-> (Agency)
CREATE (TeslaBrand) -[:class]-> (Brand)
CREATE (AppleBrand) -[:class]-> (Brand)
CREATE (IPhone) -[:class]-> (Product)
CREATE (IPad) -[:class]-> (Product)
CREATE (ConsumerElectronics) -[:class]-> (Industry)
CREATE (ElonMusk) -[:class]-> (Executive)
CREATE (TimCook) -[:class]-> (Executive)
CREATE (Beyonce) -[:class]-> (Celebrity)
CREATE (ModelXLaunch) -[:class]-> (MarketingCampaign)
CREATE (DriverlessDeath) -[:class]-> (Crisis)
CREATE (AppleAcquiresBeats) -[:class]-> (NewsEvent)
CREATE (LogoID123) -[:class]-> (LogoID)
CREATE (Agency) -[:genls]-> (Company)
CREATE (Celebrity) -[:genls]-> (Person)
CREATE (Executive) -[:genls]-> (Person)
CREATE (MarketingCampaign) -[:genls]-> (BusinessActivity)
CREATE (Crisis) -[:genls]-> (BusinessActivity)
CREATE (NewsEvent) -[:genls]-> (BusinessActivity)
```

APPENDIX B-continued

Sample Property Graph Definition in Cypher Language

```
CREATE (ProductLaunch) -[:genIs]-> (BusinessActivity)
CREATE (Tesla) -[:primaryIndustry]-> (Automotive)
CREATE (Tesla) -[:hasBrand]-> (TeslaBrand)
CREATE (Tesla) -[:hasProduct]-> (TeslaModelS)
CREATE (Tesla) -[:hasProduct]-> (TeslaModelX)
CREATE (IPhone) -[:hasBrand]-> (AppleBrand)
CREATE (IPad) -[:hasBrand]-> (AppleBrand)
CREATE (IPhone) -[:inSegment]-> (ConsumerElectronics)
CREATE (IPad) -[:inSegment]-> (ElectronicTablets)
CREATE (IPhone) -[:inSegment]-> (ConsumerElectronics)
CREATE (ElonMusk) -[:influencesSegment]-> (Automotive)
CREATE (TimCook) -[:influencesSegment]-> (ElectronicTablets)
CREATE (Tesla) -[:hasExecutive]-> (ElonMusk)
CREATE (Apple) -[:hasExecutive]-> (TimCook)
CREATE (ElectronicTablets) -[:subSegmentOf]-> (ConsumerElectronics)
CREATE (Beyonce) -[:sponsorOf]-> (Tesla)
CREATE (ModelXLaunch) -[:performedBy]-> (Tesla)
CREATE (IPadAirLaunch) -[:performedBy]-> (Apple)
CREATE (DriverlessDeath) -[:affects]-> (Tesla)
CREATE (AppleAcquiresBeats) -[:relevantTo]-> (Apple)
CREATE (Apple) -[:hasLogo]-> (LogoID123)
```

What is claimed is:

1. A non-transitory computer readable medium to store instructions that, when executed by a processor, cause the processor to:
 access a data store, the data store storing content comprising a set of articles, an index to the set of articles, and an ontology including entities and relationships between the entities;
 determine a first entity and a second entity based on an article in the set of articles;
 determine proximity data for the first entity and the second entity in the article,
 determine an entity score for the first entity;
 save the entity score in the data store, wherein the entity score is associated with the article and with the first entity;
 determine a relationship between the first entity and the second entity based on the article;
 determine a strength value for the relationship, the strength value based on the proximity data, frequency data, and time data;
 update the ontology with the strength value for the relationship;
 receive a search entity through a search interface, the search entity corresponding to the first entity;
 determine an initial set of articles based on the index, the search entity, and the ontology, the initial set of articles including a first search article and a second search article, wherein the first search article and the second search article reference the first entity;
 determine a first score for the first search article based on a frequency of appearance of the first entity in the first search article and a frequency of appearance of the second entity in the first search article multiplied by the strength value for the relationship between the first entity and the second entity;
 determine a second score for the second search article based on a frequency of appearance of the first entity in the second search article and a frequency of appearance of the second entity in the first search article multiplied by the strength value for the relationship between the first entity and the second entity;
 rank the initial set of articles based on the first score and the second score; and
 return the ranked initial set of articles through the search interface.

2. The computer readable medium of claim 1, wherein to determine the initial set of articles includes:
 to access the ontology to determine a second search entity based on the search entity and a modeled relationship between the search entity and the second search entity; and
 to include a third article in the initial set of articles based on the second search entity, the third article referencing the second search entity.

3. The computer readable medium of claim 2, wherein a modeled strength value of the modeled relationship meets or exceeds a threshold relationship strength.

4. The computer readable medium of claim 2, wherein the receipt of the search entity through the search interface comprises to:
 refine the search interface based on the determination of the second search entity;
 allow a user of the search interface to select the second search entity; and
 determine the initial set of articles based on the second search entity.

5. The computer readable medium of claim 1, wherein the first entity is associated with a search plan specific to the first entity.

6. The computer readable medium of claim 5, wherein the search plan includes a disambiguation array determined from the content.

7. The computer readable medium of claim 6, wherein the disambiguation array includes a set of terms and counter terms.

8. The computer readable medium of claim 7, wherein the determination of the initial set of articles comprises to perform a search of the content based on the disambiguation array using the index.

9. A method for identifying articles in response to a search entity, the method comprising:
 accessing a data store, the data store storing content comprising a set of articles, an index to the set of articles, and an ontology including entities and relationships between the entities;
 determining a first entity and a second entity based on an article in the set of articles;
 determining proximity data for the first entity and the second entity in the article;
 determining an entity score for the first entity;
 saving the entity score in the data store, wherein the entity score is associated with the article and with the first entity;
 determining a relationship between the first entity and the second entity based on the article;
 determining a strength value for the relationship, the strength value based on the proximity data, frequency data, and time data;
 updating the ontology with the strength value for the relationship;
 receiving a search entity through a search interface, the search entity corresponding to the first entity;
 determining an initial set of articles based on the index, the search entity, and the ontology, the initial set of articles including a first search article and a second search article, wherein the first search article and the second search article reference the first entity;
 determining a first score for the first search article based on a frequency of appearance of the first entity in the first search article and a frequency of appearance of the second entity in the first search article multiplied by the strength value for the relationship between the first entity and the second entity;

determining a second score for the second search article based on a frequency of appearance of the first entity in the second search article and a frequency of appearance of the second entity in the first search article multiplied by the strength value for the relationship between the first entity and the second entity;

ranking the initial set of articles based on the first score and the second score; and returning the ranked initial set of articles through the search interface.

10. The method of claim 9, wherein the step of determining the initial set of articles comprises:

accessing the ontology to determine a second search entity based on the search entity and a modeled relationship between the search entity and the second search entity; and including a third article in the initial set of articles based on the second search entity, the third article referencing the second search entity.

11. The method of claim 10, wherein a modeled strength value of the modeled relationship meets or exceeds a threshold relationship strength.

12. The method of claim 10, wherein the receipt of the search entity through the search interface comprises:

refining the search interface based on the determination of the second search entity;

allowing a user of the search interface to select the second search entity; and determining the initial set of articles based on the second search entity.

13. The method of claim 9, wherein the first entity is associated with a search plan specific to the first entity.

14. The method of claim 13, wherein the search plan includes a disambiguation array determined from the content.

15. The method of claim 14, wherein the disambiguation array includes a set of terms and counter terms.

16. The method of claim 15, wherein the determination of the initial set of articles comprises to perform a search of the content based on the disambiguation array using the index.

* * * * *